(12) United States Patent
Suzuki et al.

(10) Patent No.: US 9,176,587 B2
(45) Date of Patent: Nov. 3, 2015

(54) TACTILE SENSE PRESENTATION DEVICE AND TACTILE SENSE PRESENTATION METHOD

(71) Applicant: Panasonic Corporation, Osaka (JP)

(72) Inventors: Takeshi Suzuki, Osaka (JP); Tetsuyoshi Ogura, Osaka (JP); Koichi Hirano, Osaka (JP); Daisuke Wakuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 45 days.

(21) Appl. No.: 14/342,151

(22) PCT Filed: Jun. 7, 2013

(86) PCT No.: PCT/JP2013/003616
§ 371 (c)(1),
(2) Date: Feb. 28, 2014

(87) PCT Pub. No.: WO2014/002404
PCT Pub. Date: Jan. 3, 2014

(65) Prior Publication Data
US 2014/0240110 A1      Aug. 28, 2014

(30) Foreign Application Priority Data

| Jun. 29, 2012 | (JP) | ................................ | 2012-147244 |
| Jul. 18, 2012 | (JP) | ................................ | 2012-159780 |
| Jul. 18, 2012 | (JP) | ................................ | 2012-159783 |
| Jul. 18, 2012 | (JP) | ................................ | 2012-159785 |
| Aug. 1, 2012 | (JP) | ................................ | 2012-171418 |

(51) Int. Cl.
*G08B 6/00* (2006.01)
*G06F 3/01* (2006.01)
(Continued)

(52) U.S. Cl.
CPC ................ *G06F 3/016* (2013.01); *G06F 3/041* (2013.01); *G06F 3/044* (2013.01); *G06F 3/0412* (2013.01); *G06F 3/0488* (2013.01); *G06F 3/04883* (2013.01); *G08B 6/00* (2013.01)

(58) Field of Classification Search
CPC ......... G08B 6/00; G06F 3/0414; G06F 3/016; G06F 3/041; G06F 3/0488
USPC .......... 340/407.1, 407.2, 384.7, 7.6; 345/156, 345/157, 173, 174
See application file for complete search history.

(56) References Cited

U.S. PATENT DOCUMENTS

| 7,924,144 B2 | 4/2011 | Makinen et al. |
| 7,982,588 B2 | 7/2011 | Makinen et al. |

(Continued)

FOREIGN PATENT DOCUMENTS

| JP | 2002-41208 | 2/2002 |
| JP | 2003-248540 | 9/2003 |

(Continued)

OTHER PUBLICATIONS

International Preliminary Report on Patentability issued in International Application No. PCT/JP2013/003616 on Jan. 8, 2015.

(Continued)

*Primary Examiner* — Hung T Nguyen
(74) *Attorney, Agent, or Firm* — Wenderoth, Lind & Ponack, L.L.P.

(57) ABSTRACT

A tactile sense presentation device including: a tactile-sense presentation unit having a first working electrode group of a plurality of first working electrodes arranged along a first direction; and a control unit operable to apply a first tactile sense signal having a first waveform to each of the first working electrodes. The control unit applies the first tactile sense signal, in which a phase difference corresponding to a distance between adjacent first working electrodes is applied to the first waveform, to each of the plurality of first working electrodes so as to cause the first waveform to travel along the first direction at a predetermined speed.

23 Claims, 18 Drawing Sheets

(51) Int. Cl.
*G06F 3/041* (2006.01)
*G06F 3/0488* (2013.01)
*G06F 3/044* (2006.01)

(56) References Cited

U.S. PATENT DOCUMENTS

| | | | |
|---|---|---|---|
| 8,174,373 | B2 | 5/2012 | Makinen et al. |
| 8,212,783 | B2 | 7/2012 | Kim et al. |
| 8,330,590 | B2 | 12/2012 | Poupyrev et al. |
| 8,330,729 | B2 | 12/2012 | Tachi et al. |
| 8,570,163 | B2 | 10/2013 | Makinen et al. |
| 9,063,627 | B2 | 6/2015 | Yairi et al. |
| 2008/0129705 | A1 | 6/2008 | Kim et al. |
| 2009/0079550 | A1 | 3/2009 | Makinen et al. |
| 2009/0109007 | A1 | 4/2009 | Makinen et al. |
| 2009/0174671 | A1 | 7/2009 | Tachi et al. |
| 2010/0085169 | A1 | 4/2010 | Poupyrev et al. |
| 2011/0074733 | A1 | 3/2011 | Makinen et al. |
| 2011/0109588 | A1 | 5/2011 | Makinen et al. |
| 2011/0141052 | A1 | 6/2011 | Bernstein et al. |
| 2011/0227872 | A1* | 9/2011 | Huska et al. ............ 345/174 |
| 2011/0254672 | A1* | 10/2011 | Ciesla et al. ............ 340/407.2 |
| 2011/0254799 | A1 | 10/2011 | Makinen et al. |
| 2012/0062516 | A1 | 3/2012 | Chen et al. |
| 2012/0133645 | A1 | 5/2012 | Jung et al. |
| 2012/0242463 | A1 | 9/2012 | Makinen et al. |
| 2012/0268386 | A1* | 10/2012 | Karamath et al. ......... 345/173 |
| 2014/0146005 | A1 | 5/2014 | Hong et al. |
| 2014/0160063 | A1 | 6/2014 | Yairi et al. |
| 2014/0160064 | A1 | 6/2014 | Yairi et al. |
| 2014/0192005 | A1 | 7/2014 | Wakuda et al. |
| 2014/0225848 | A1 | 8/2014 | Ogura et al. |
| 2014/0240110 | A1 | 8/2014 | Suzuki et al. |
| 2014/0293147 | A1 | 10/2014 | Tang et al. |
| 2014/0340210 | A1 | 11/2014 | Wakuda et al. |
| 2015/0149967 | A1 | 5/2015 | Bernstein et al. |

FOREIGN PATENT DOCUMENTS

| | | |
|---|---|---|
| JP | 2004-319255 | 11/2004 |
| JP | 2005-55489 | 3/2005 |
| JP | 2005-85048 | 3/2005 |
| JP | 2006-163206 | 6/2006 |
| JP | 2006-251948 | 9/2006 |
| JP | 2007-87239 | 4/2007 |
| JP | 2008-146649 | 6/2008 |
| JP | 2009-87359 | 4/2009 |
| JP | 2010-86471 | 4/2010 |
| JP | 2011-2926 | 1/2011 |
| JP | 2011-107879 | 6/2011 |
| JP | 2012-114920 | 6/2012 |
| WO | 2010/139171 | 12/2010 |

OTHER PUBLICATIONS

International Preliminary Report on Patentability issued in International Application No. PCT/JP2013/003617 on Jan. 8, 2015.
International Preliminary Report on Patentability issued in International Application No. PCT/JP2013/003870 on Jan. 8, 2015.
International Preliminary Report on Patentability issued in International Application No. PCT/JP2013/003871 on Jan. 8, 2015.
International Preliminary Report on Patentability issued in International Application No. PCT/JP2013/003872 on Jan. 8, 2015.
International Search Report (ISR) issued Aug. 20, 2013 in International (PCT) Application No. PCT/JP2013/003617.
International Search Report (ISR) issued Jul. 23, 2013 in International (PCT) Application No. PCT/JP2013/003616.
International Search Report (ISR) issued Sep. 17, 2013 in International (PCT) Application No. PCT/JP2013/003870.
International Search Report (ISR) issued Sep. 17, 2013 in International (PCT) Application No. PCT/JP2013/003871.
International Search Report (ISR) issued Sep. 17, 2013 in International (PCT) Application No. PCT/JP2013/003872.
USPTO Office Action issued May 4, 2015 in corresponding U.S. Appl. No. 14/241,204.
USPTO Office Action issued Jul. 17, 2015 in U.S. Appl. No. 14/241,639.
USPTO Office Action issued Jul. 31, 2015 in related U.S. Appl. No. 14/241,701.

* cited by examiner $$\Delta t_i = \frac{l_i}{v}$$

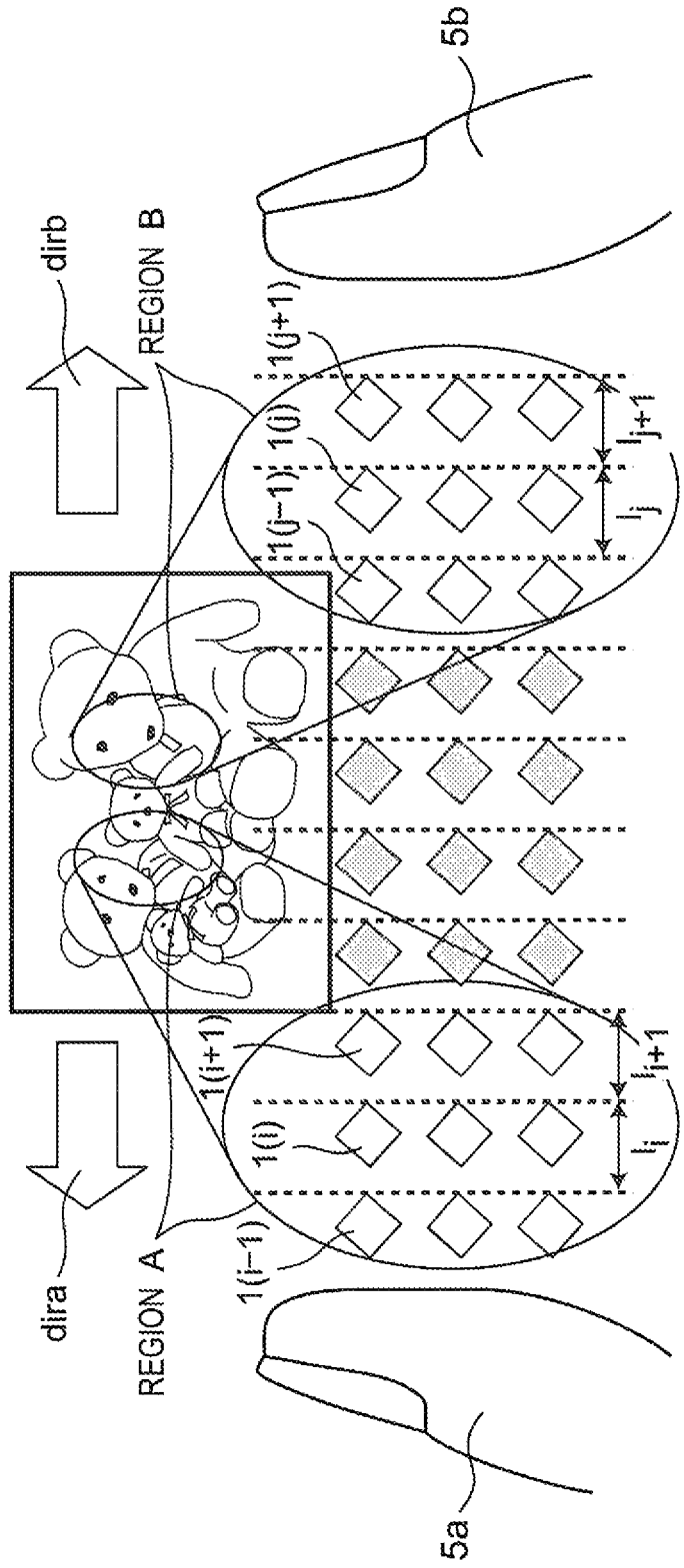

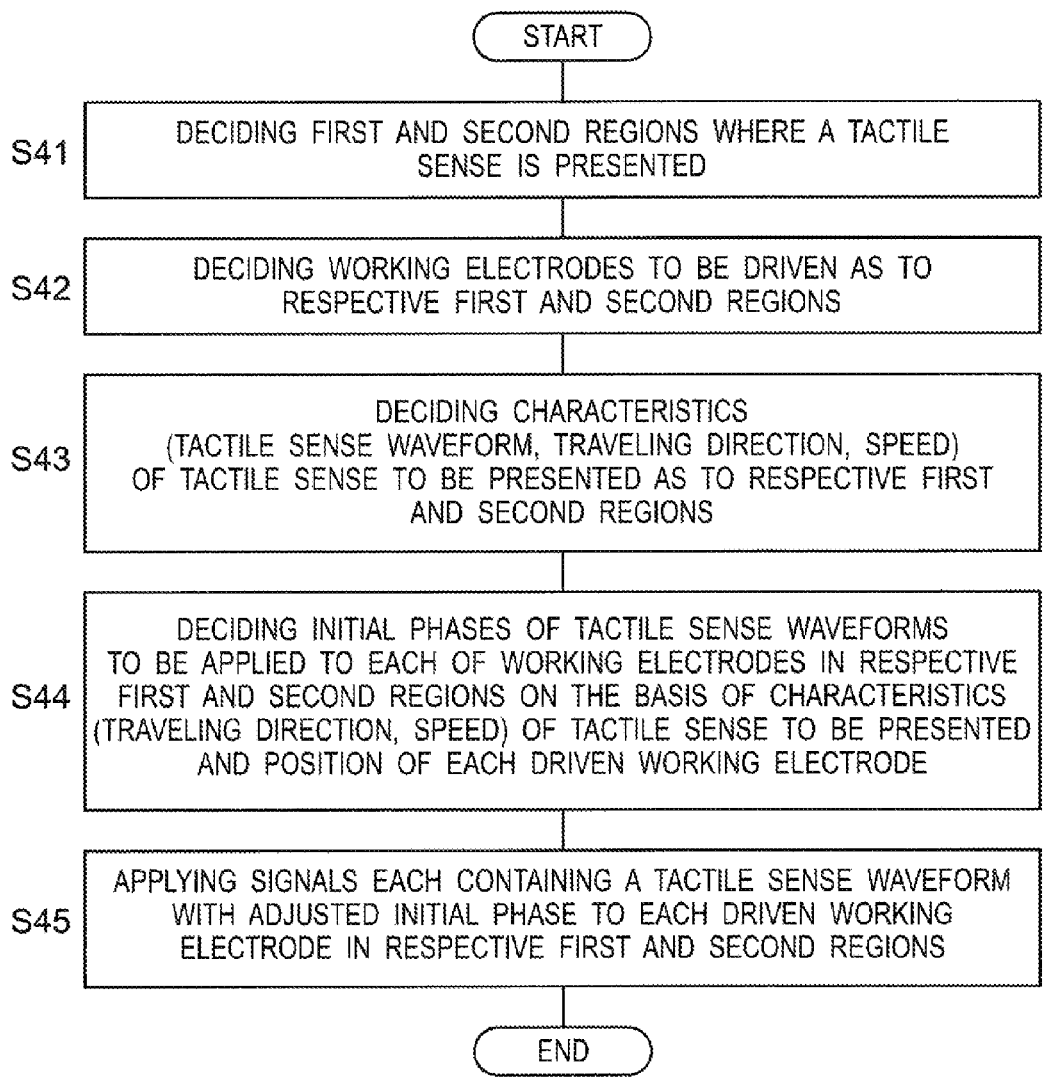

TACTILE SENSE PRESENTATION DEVICE AND TACTILE SENSE PRESENTATION METHOD

TECHNICAL FIELD

The technical field concerns a device and a method for presenting a tactile sense, e.g., a device and a method for presenting a tactile sense by application of electrical stimulations.

BACKGROUND ART

Recent years have seen active studies on devices for presenting a tactile sense to a user.

Patent Literature 1 discloses a device that stimulates subcutaneous Pacinian corpuscles of a user by means of capacitive coupling formed between the device and the user, thereby presenting a tactile sense to the user. The device in Patent Literature 1 includes at least one conductive electrode provided with an insulator. The conductive electrode is driven with an electrical input containing a component having a frequency in a range from 10 Hz to 1000 Hz. In accordance with an electrical input, a capacitive coupling is formed between the conductive electrode and the user's skin, which are in proximity to each other with an insulator therebetween. The user perceives the capacitive coupling formed in accordance with the electrical input as vibrations tactually.

CITATION LIST

Patent Literature

PTL 1: JP 2009-087359 A

SUMMARY OF INVENTION

Technical Problem

However, the conventional art is limited with regard to a range of a tactile sense to be obtained from a tactile sense presentation device when, for example, a user touches the tactile sense presentation device with his/her finger.

Hence, one aspect of the present invention provides a tactile sense presentation device with improved tactile sense expressing function as compared with devices according to the conventional art.

Solution to Problem

According to one aspect of the present invention, a tactile sense presentation device includes: a tactile sense presentation unit including a first working electrode group of a plurality of first working electrodes arranged along a first direction; and a control unit operable to apply a first tactile sense signal having a first waveform to each of the first working electrodes. Herein, the control unit applies the first tactile sense signal, in which a phase difference corresponding to a distance between adjacent first working electrodes is applied to the first waveform, to each of the plurality of first working electrodes so as to cause the first waveform to travel along the first direction at a predetermined speed.

This generalized and specified aspect may be realized by a system, a method, a computer program, as well as any combination among the system, the method and the computer program.

Advantageous Effects of Invention

In the tactile sense presentation device according to the aspect of the present invention, the control unit sets the phase difference to the first waveform such that the first waveform travels along the first direction at the predetermined speed, and applies the first tactile sense signal having the first waveform to each of the plurality of first working electrodes of the tactile sense presentation unit. Thus, the tactile sense expressing function of the tactile sense presentation device is improved as compared with devices according to the conventional art.

BRIEF DESCRIPTION OF DRAWINGS

FIG. 17 is a diagram illustrating the layout of working electrodes in tactile sense presentation regions A and B.

FIG. 19 is a flowchart of processing to be executed by a tactile sense presentation device according to a third embodiment of the present invention.

DESCRIPTION OF EMBODIMENTS

Figure 1:
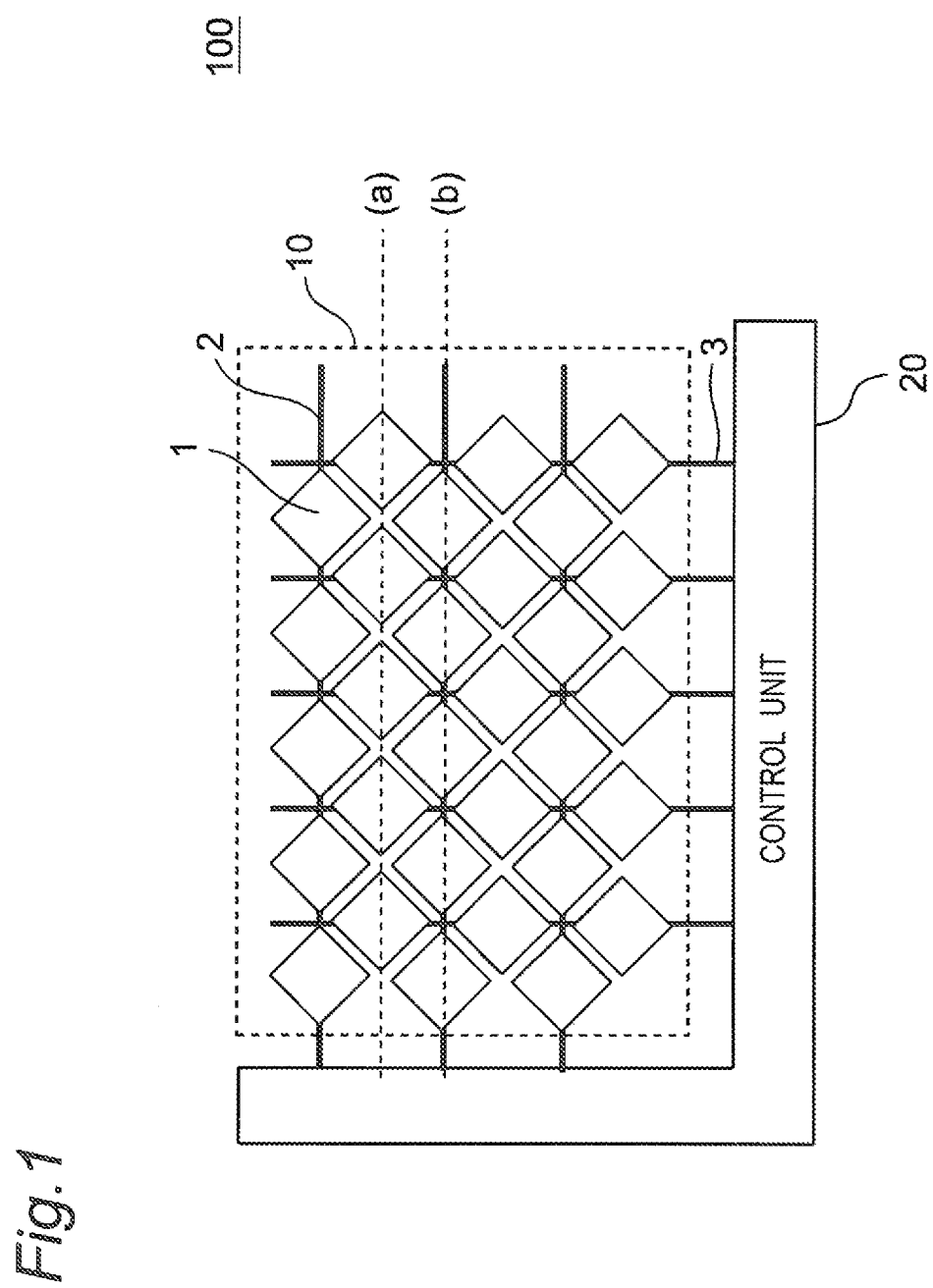
FIG. 1 is a diagram illustrating a structure of a tactile sense presentation device according to a first embodiment of the present invention.

1. How the Following Aspects have been Achieved

A tactile sense presentation device is capable of providing tactile sense information in collaboration with a display device that provides visual information and a speaker system that provides audio information. In this respect, the tactile sense presentation device is expected as a device for providing a variety of information to a user. Specifically, the tactile sense presentation device is capable of presenting to a user a tactile sense, such as a rough texture or a smooth texture, corresponding to an image displayed on the display device. In this case, the tactile sense presentation device including a transparent tactile sense presentation unit may be disposed on a screen of the display device. Accordingly, the user touches the screen, on which an image is displayed, with his/her finger (actually, touches the transparent tactile sense presentation unit with his/her finger), thereby gaining such experience as to feel the texture (the sense of touch) of the image through his/her finger.

Examples of a tactile sense presentation method proposed heretofore include a method of transmitting, to a human body site, mechanical vibrations generated by a motor or the like, and a method of stimulating a human skin surface with an electric signal. Particularly, the method of stimulating a skin surface with an electric signal allows fabrication of a thin and lightweight device using a fine patterning technique such as photolithography, and facilitates the two-dimensional layout of electrodes. Thus, the resultant device is suitable for mobile applications.

Typically, a human being can sensitively sense a change of tactile sense stimulations rather than an absolute value of the tactile sense stimulations, through a skin surface. In the conventional art, accordingly, a human being traces a tactile sense presentation unit with his/her finger, that is, a human being moves his/her finger while keeping a state that his/her finger is in contact with or in proximity to the tactile sense presentation unit (traces the unit with his/her finger), thereby explicitly perceiving a tactile sense such as a smooth texture or a rough texture.

However, the tactile sense presentation unit is required to have a comparatively large area in order that a human being traces the tactile sense presentation unit with his/her finger. Additionally, there is no room for moving the finger at an end or corner of the tactile sense presentation unit, so that the presentation of the tactile sense becomes difficult.

In a tactile sense presentation device for mobile applications, the size of a tactile sense presentation unit is limited. Therefore, such a device demands a method for presenting a tactile sense without a necessity to move a finger.

Aspects to be described later provide a tactile sense presentation device capable of explicitly presenting a tactile sense, such as a smooth texture or a rough texture, to a user with good sensitivity through his/her finger (a tactile sense presentation target site) without making the user to relatively move his/her finger to a tactile sense presentation unit. Specifically, the tactile sense presentation device according to the aspects to be described later generates for the user's finger (the tactile sense presentation target site) electrical stimulations which travel on the tactile sense presentation unit along a predetermined direction with time. Thus, the tactile sense presentation device makes the user to perceive vibrational motion which propagates the tactile sense presentation unit along the predetermined direction, at a position immediately below the user's finger. In the tactile sense presentation device, the vibrational motion traveling along the predetermined direction is realized as follows. That is, the tactile sense presentation unit includes a plurality of extremely minute working electrodes which are adjacent to one another, and these working electrodes generate vibrational electrical stimulations which are identical in form with one another, with a phase difference corresponding to the traveling speed (i.e., a timing difference). Therefore, the user can perceive by touch, without moving his/her finger, a tactile sense which is equal to that obtained in the case where the user passively and relatively moves his/her finger on and to the tactile sense presentation unit of the tactile sense presentation device (traces the tactile sense presentation unit with his/her finger).

The aspects to be described later also provide a tactile sense presentation device with a touch panel function. This tactile sense presentation device appropriately presents a tactile sense in a region where the presence of a finger (a tactile sense presentation target site) is detected by means of the touch panel function, on a tactile sense presentation unit. Thus, this tactile sense presentation device realizes a touch panel capable of presenting a tactile sense in a region touched with a finger (tactile sense feedback).

The aspects to be described later also allow collaboration with a display device that displays an image. According to the aspects to be described later, the tactile sense presentation device receives information of an image displayed on the display device (e.g., information about a tactile sense corresponding to the displayed image), thereby presenting various tactile senses corresponding to the image, to a user in real time (in synchronization with a change of the displayed image.

With reference to the drawings, hereinafter, description will be given of embodiments corresponding to the respective aspects of the present invention.

2. First Embodiment

2-1. Configuration

FIG. 1 is a diagram illustrating a structure of a (passive matrix-type) tactile sense presentation device 100 according to a first embodiment corresponding to one aspect of the present invention. As illustrated in FIG. 1, the tactile sense presentation device 100 includes a tactile sense presentation unit 10 and a control unit 20.

Figure 2:
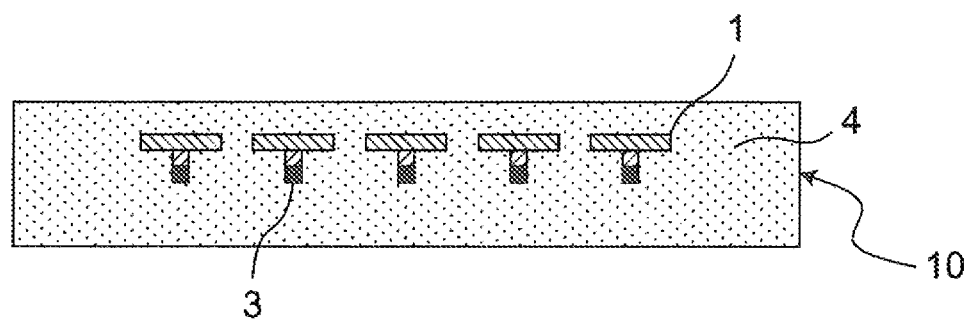
FIG. 2 is a sectional view of a tactile sense presentation unit, the sectional view being taken along a line (a) in FIG. 1.
Figure 3:
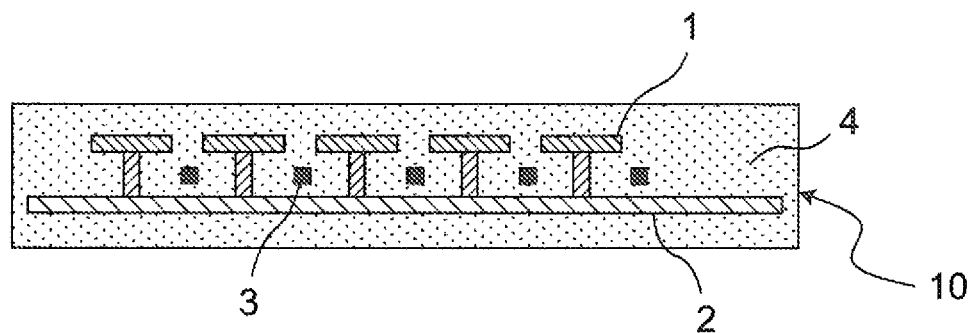
FIG. 3 is a sectional view of the tactile sense presentation unit, the sectional view being taken along a line (b) in FIG. 1.

FIG. 2 is a sectional view of the tactile sense presentation unit 10, the sectional view being taken along a line (a) in FIG. 1. FIG. 3 is a sectional view of the tactile sense presentation unit 10, the sectional view being taken along a line (b) in FIG. 1.

Referring to FIGS. 2 and 3 together with FIG. 1, the tactile sense presentation unit 10 includes a plurality of working electrodes 1, a plurality of first conductors 2, a plurality of second conductors 3, and an insulator disposed to surround the working electrodes 1.

Each of the working electrodes 1 is an about 100 nm-thick and about 0.8 mm-square electrode made of ITO (Indium Tin Oxide). The working electrodes 1 are arranged in a single plane form with a 1 mm-pitch such that a distance between the adjacent electrodes is about 0.2 mm. With regard to the working electrodes 1, the shape, the pitch and the electrode-to-electrode distance are not limited to the numerical examples described above. With regard to the working electrodes 1, moreover, the material is not limited to the example described above. The tactile sense presentation unit 10 may include the plurality of working electrodes 1, more specifically, at least three working electrodes 1 arranged along a certain direction.

The first conductors 2 are disposed below the working electrodes 1, and extend in a certain direction. In this embodiment, the first conductors 2 are routed in a parallel direction with the plane where the working electrodes 1 are arranged, and are connected to the working electrodes 1 disposed immediately thereon. The second conductors 3 are disposed below the working electrodes 1. The second conductors 3 extend in a certain direction which is different from the extending direction of the first conductors 2, and are connected to the working electrodes 1 disposed immediately thereon. In this embodiment, the second conductors 3 are routed in parallel with the plane where the working electrodes 1 are arranged, so as to cross the first conductors 2. In other words, each of the working electrodes 1 is electrically connected to the first conductor 2 or the second conductor 3 at the lower side thereof.

Each of the first conductor 2 and the second conductor 3 has a thickness of about 100 nm and a line width of about 50 µm, and is made of ITO (Indium Tin Oxide).

Herein, the working electrode 1, the first conductor 2 and the second conductor 3 may be made of any material as long as such a material is electrically conductive. Examples of the material for the working electrode 1, first conductor 2 and second conductor 3 may include metal oxides such as ZnO (Zinc Oxide), metals such as Al, Ag and Au, and electroconductive organic materials.

The insulator 4 contains a glass material, and is configured to surround the working electrodes 1. The insulator 4 has a thickness of about 1 µm at a surface of the working electrode 1. Herein, the material for the insulator 4 is not limited to a glass material. For example, the insulator 4 may be made of a material which ensures an insulation property and transparency. Examples of the insulator 4 may include an organic insulator made of PET, polyimide or the like. The insulator 4 is transparent with regard to visible light in the foregoing description, but may be semi-transparent or opaque with regard to visible light. In other words, the insulator 4 is not limited with regard to the transparency thereof.

The control unit 20 controls the tactile sense presentation unit 10. The control unit 20 can be realized with, for example, a processor capable of executing a program for realizing functions to be described later, and a memory capable of holding the program and various data. Alternatively, the control unit 20 may be realized with a hard-wired element (a dedicated electric circuit) for realizing the functions to be described later.

Figure 4:
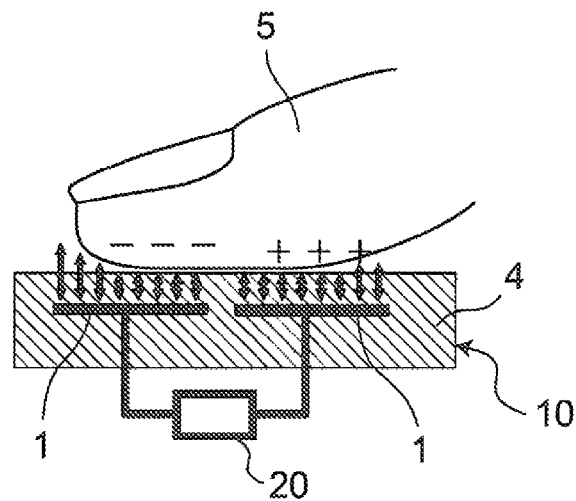
FIG. 4 is a diagram illustrating interaction between a tactile sense presentation target site (a finger) and working electrodes.
Figure 5:
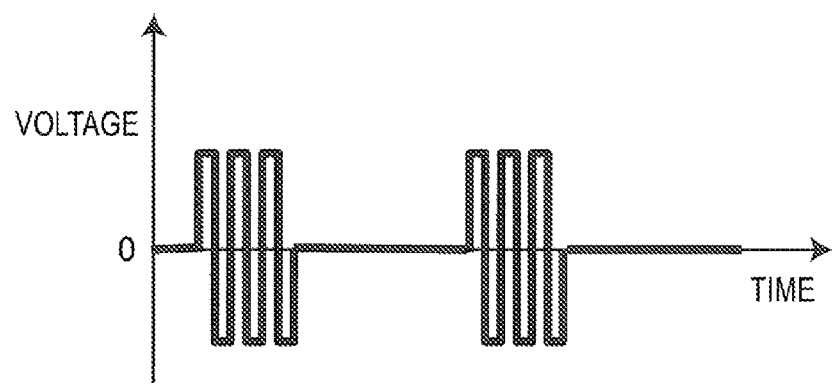
FIG. 5 is a diagram illustrating a waveform example of a tactile sense signal to be applied to the working electrode.
Figure 6:
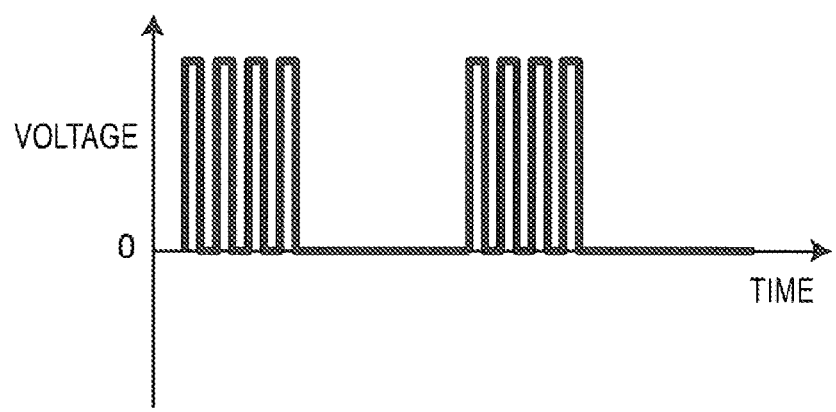
FIG. 6 is a diagram illustrating a waveform example of the tactile sense signal to be applied to the working electrode.

The control unit 20 controls the tactile sense presentation unit 10 such that the tactile sense presentation unit 10 presents a tactile sense in a partial region thereof. Upon presentation of the tactile sense, the control unit 20 applies predetermined electric signals (voltages) to the working electrodes 1 in the tactile sense presentation region, through the first conductor 2 and the second conductor 3 connected to the respective working electrodes 1. With reference to FIGS. 4, 5 and 6, next, general description will be given of a tactile sense presentation method.

FIG. 4 is a diagram schematically illustrating operations of the tactile sense presentation device 100 upon presentation of a tactile sense to a tactile sense presentation target site (finger) 5.

The control unit 20 applies predetermined voltages to the working electrodes 1 (e.g., the working electrode 1 connected to the second conductor 3 (the left working electrode 1 in FIG. 4) and the working electrode 1 connected to the first conductor 2 (the left working electrode 1 in FIG. 4)). The voltage is applied to the working electrode 1 so as to vibrationally change in a temporally predetermined pattern. Herein, the voltage signal indicating the change pattern is referred to as a "tactile sense signal", and the change pattern is referred to as a "waveform".

FIGS. 5 and 6 are diagrams each illustrating an example of the waveform of the tactile sense signal. As illustrated in FIG. 5, the tactile sense signal may have a pulse waveform which temporally changes between a predetermined positive voltage and a predetermined negative voltage. As illustrated in FIG. 6, the tactile sense signal may have a pulse waveform which temporally changes between a predetermined positive voltage and zero.

Referring to FIG. 4 again, the control unit 20 applies to the working electrodes 1 the tactile sense signals having the waveform illustrated in FIG. 5 or 6, through the first conductor 2 and the second conductor 3.

Then, dielectric polarization is formed in the finger 5, a dielectric substance, and, hence, an electrostatic force is acted on between the finger 5 and the working electrode 1 such that the magnitude thereof vibrationally changes while following the waveform of the tactile sense signal. The user perceives as vibrations the electrostatic force which vibrationally changes with time, through a receptor of the finger 5.

Typically, a human being moves his/her finger so as to trace an object's surface, thereby perceiving, through a receptor, vibrations generated on the skin by dynamic interaction between the finger and the object's surface, and perceives by touch a texture (e.g. a smooth texture or a rough texture) of the object's surface in accordance with vibration characteristics determined from the a vibration frequency, a vibration amplitude and the like.

In the tactile sense presentation device 100, the tactile sense presentation unit 10 applies, to the tactile sense presentation target site 5 (e.g., the user's finger), electrical stimulations which vibrationally change with time. Thus, the tactile sense presentation unit 10 imitates vibrations generated by the dynamic interaction with the object's surface, and presents a tactile sense to the user. The texture to be perceived by touch (the sense of touch) changes in accordance with a difference between the maximum voltage and the minimum voltage of the tactile sense signal, and a frequency of the tactile sense signal (herein, the frequency refers to the number of pulses per unit time). With regard to the texture to be perceived by touch of the user (the sense of touch), as the difference between the maximum voltage and the minimum voltage of the tactile sense signal is large, the user strongly feels a rough texture. On the other hand, as the frequency of the tactile sense signal is high, the user feels a smooth texture.

Next, detailed description will be given of a configuration of the control unit 20.

Figure 7:
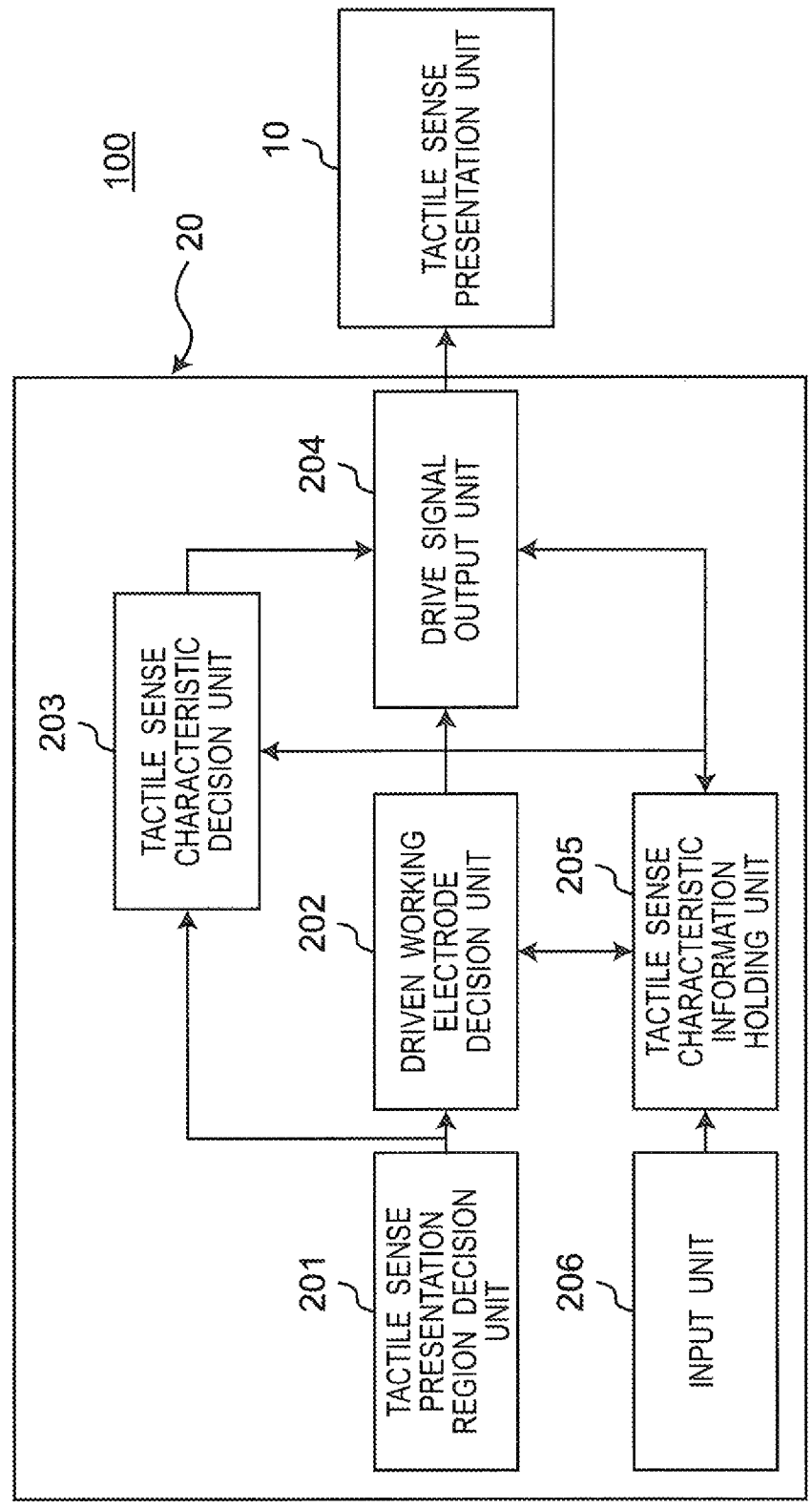
FIG. 7 is a block diagram of the tactile sense presentation device according to the first embodiment of the present invention.

FIG. 7 is a block diagram illustrating the details of the control unit 20.

The control unit 20 includes a tactile sense presentation region decision unit 201, a driven working electrode decision unit 202, a tactile sense characteristic decision unit 203, a drive signal output unit 204, a tactile sense characteristic information holding unit 205 and an input unit 206.

Each of the tactile sense presentation region decision unit 201, the driven working electrode decision unit 202, the tactile sense characteristic decision unit 203, the drive signal output unit 204 and the tactile sense characteristic information holding unit 205 is realized with a processor(s) that executes a program(s) for realizing the function of each unit, as well as a memory that holds the program(s) and various data. Alternatively, each unit may be realized with a dedicated circuit(s). The input unit 206 can be realized with a processor(s) and a memory, or an input terminal connected to a dedicated circuit(s).

The tactile sense presentation region decision unit 201 decides a region on the tactile sense presentation unit 10 that presents a tactile sense (i.e., a tactile sense presentation region).

The driven working electrode decision unit 202 identifies the working electrode 1 in the tactile sense presentation region, and decides the working electrode 1 to be driven for presenting a tactile sense (i.e., the driven working electrode).

The tactile sense characteristic decision unit 203 decides characteristics (e.g., a tactile sense signal waveform, a traveling direction and a traveling speed) of a tactile sense to be presented in the tactile sense presentation region, on the basis of tactile sense characteristic information held by the tactile sense characteristic information holding unit 205 with associated with the partial region on the tactile sense presentation unit 10.

The drive signal output unit 204 decides an initial phase of the tactile sense signal to be applied to each of the driven working electrodes 1, on the basis of the tactile sense characteristics (particularly, the traveling direction and the traveling speed), and information about the disposed position of each of the working electrodes 1, the information held by the tactile sense characteristic information holding unit 205. Then, the drive signal output unit 204 applies the tactile sense signal to each of the driven working electrodes on the basis of the decided initial phase. Herein, the drive signal output unit 204 does not necessarily apply the tactile sense signal to the working electrode 1 other than the driven working electrode 1 (i.e., the working electrode 1 disposed out of the tactile sense presentation region on the tactile sense presentation unit 10).

The tactile sense characteristic information holding unit 205 holds the characteristics (i.e., the tactile sense signal, the traveling direction and the traveling speed) of the tactile sense to be presented in the partial region on the tactile sense presentation unit 10, as well as information about the disposed positions of the respective working electrodes 1 on the tactile sense presentation unit 10. The tactile sense characteristics are held with associated with the respective partial regions on the tactile sense presentation unit 10. Thus, it is possible to present tactile senses which are different from one another, in the respective partial regions on the tactile sense presentation unit 10.

The input unit 206 corresponds to an input terminal to be provided for receiving the information about the tactile sense characteristics from the outside of the control unit 20. The control unit 20 is capable of updating the tactile sense characteristic information held by the tactile sense characteristic information holding unit 205, at any time on the basis of the tactile sense characteristic information received from the outside. Thus, the tactile sense presentation device 100 is capable of changing in real time the characteristics of the tactile senses presented in the respective partial regions on the tactile sense presentation unit 10, in accordance with the external input. For example, the input unit 206 receives the information about the characteristics of the tactile senses associated with respective portions of an image displayed on a display device (not illustrated). Then, the control unit 20 updates the tactile sense characteristic information held by the tactile sense characteristic information holding unit 205, on the basis of the characteristics. Thus, it is possible to present the tactile sense corresponding to the image displayed on the display device.

2-2. Operations

Hereinafter, description will be given of operations of the tactile sense presentation device 100 according to the first embodiment. It is assumed in the following description that the tactile sense presentation unit 10 of the tactile sense presentation device 100 is transparent and is disposed on a user-side of a screen of the display device.

Figure 8:
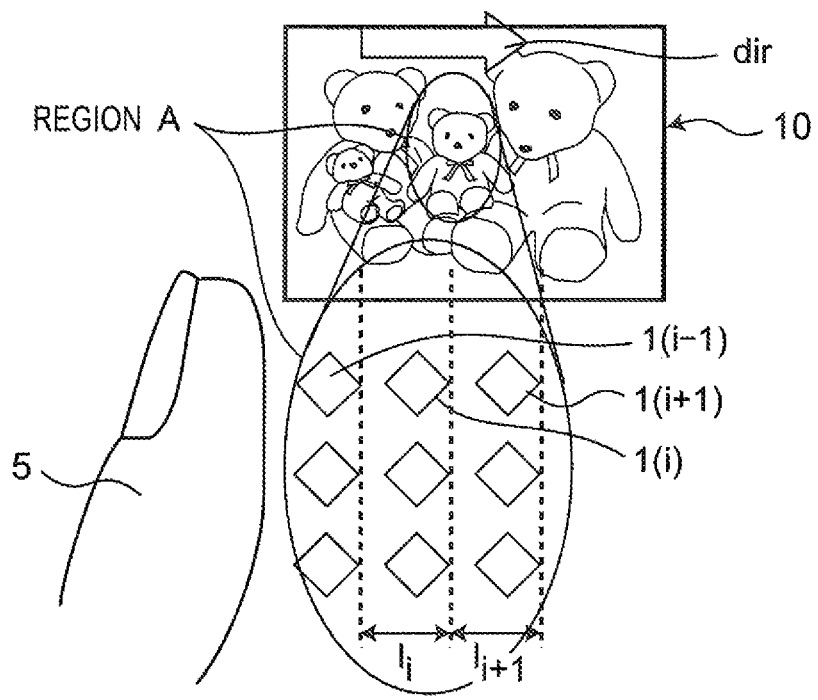
FIG. 8 is a diagram illustrating the layout of the working electrodes in a tactile sense presentation region.
Figure 9:
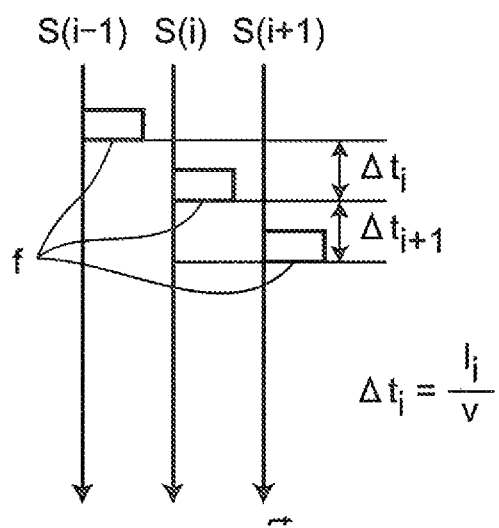
FIG. 9 is a diagram illustrating tactile sense signals to be applied to the respective working electrodes in the tactile sense presentation region.
Figure 10:
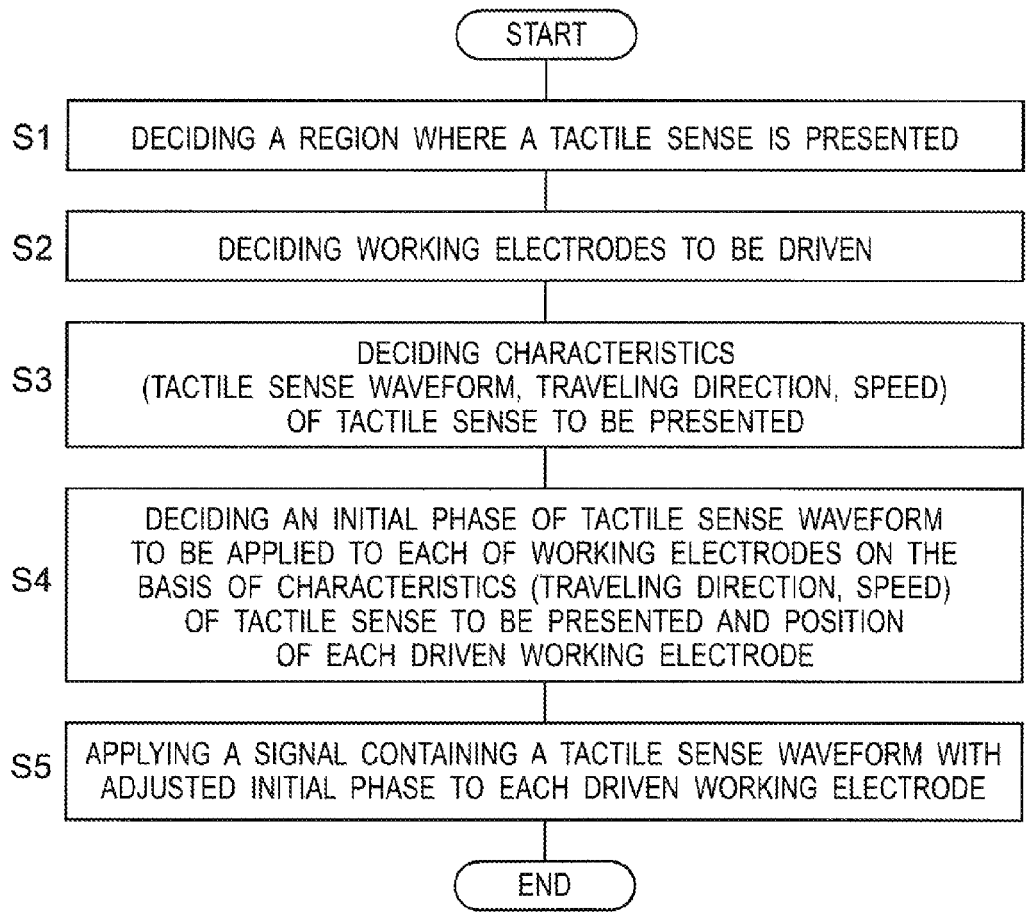
FIG. 10 is a flowchart of processing to be executed by the tactile sense presentation device according to the first embodiment of the present invention.

FIG. 8 is a diagram illustrating a state that the user touches with his/her finger 5 a region A on the tactile sense presentation unit 10. Herein, the plurality of working electrodes 1 (1($i$−1), 1($i$), 1($i$+1)) is disposed on the region A touched by the user. FIG. 9 is a diagram illustrating tactile sense signals to be applied to the respective driven working electrodes 1 (1($i$−1), 1($i$), 1($i$+1)) in the region A. FIG. 10 is a flowchart of processing to be executed by the tactile sense presentation device 100 in order to present a tactile sense in the region A.

First, the tactile sense presentation region decision unit 201 of the control unit 20 decides a tactile sense presentation region (step S1). Herein, the tactile sense presentation region decision unit 201 decides the region A as the tactile sense presentation region.

Next, the driven working electrode decision unit 202 of the control unit 20 identifies the working electrodes 1 in the tactile sense presentation region (the region A), on the basis of the information about the disposed positions of the working electrodes 1, the information held by the tactile sense characteristic information holding unit 205. Then, the driven working electrode decision unit 202 decides the working electrodes 1 in the region A as the driven working electrodes 1 (step S2). In the example illustrated in FIG. 8, the decided driven working electrodes 1 are the electrodes 1($i$−1), the electrodes 1($i$) and the electrodes 1($i$+1). Herein, the working electrodes 1($i$) refer to a working electrode group arranged in an i-th column (in a vertical direction) among the working electrode groups of the tactile sense presentation unit 10.

Next, the tactile sense characteristic decision unit 203 of the control unit 20 acquires the tactile sense characteristic information about the region A from the tactile sense characteristic information holding unit 205. Then, the tactile sense characteristic decision unit 203 decides the characteristics of the tactile sense to be presented in the region A (step S3). Herein, the tactile sense characteristic information acquired by the tactile sense characteristic decision unit 203 is information about the waveform of the tactile sense signal, the traveling direction of the tactile sense, and the traveling speed of the tactile sense. In the example illustrated in FIG. 8, the decided waveform of the tactile sense signal is a waveform f (FIG. 9). The decided traveling direction and speed are the direction (a direction of an arrow dir) and speed (v (FIG. 9)) represented by a vector dir.

Next, the drive signal output unit 204 of the control unit 20 decides the initial phase of the tactile sense signal corresponding to the tactile sense characteristic decided by the tactile sense characteristic decision unit 203, for each of the driven working electrodes 1 decided by the driven working electrode decision unit 202 (step S4).

Specifically, the drive signal output unit 204 specifies a timing of applying electrical stimulations (vibrations to be presented) to the user with each driven working electrode (the electrode 1($i$−1), the electrode 1($i$) or the electrode 1($i$+1)), as the initial phase of the tactile sense signal to be applied to each driven working electrode (the electrode 1($i$−1), the electrode 1($i$) or the electrode 1($i$+1)), on the basis of the traveling direction and the traveling speed among the tactile sense characteristics decided by the tactile sense characteristic decision unit 203, in consideration of the disposed position of each driven working electrode.

In the example illustrated in FIG. 8, the driven working electrode 1($i$−1) and the driven working electrode 1($i$) are different from each other, in the disposed position along the traveling direction (the arrow dir), by a distance $l_i$. Likewise, the driven working electrode 1($i$) and the driven working electrode 1($i$−1) are different from each other, in the disposed position along the traveling direction (the arrow dir), by a distance $l_{i+1}$. Therefore, the drive signal output unit 204 decides, from the distance $l_i$ and the traveling speed v, the initial phase $\Delta t_i$ of the tactile sense signal (the waveform f) to be applied to the driven working electrode 1($i$) (a delay amount of the phase of the tactile sense signal to be applied to the driven working electrode 1($i$), to the phase of the tactile sense signal to be applied to the driven working electrode 1($i$−1)), as $\Delta t_i = l_i / v$. Likewise, the drive signal output unit 204 decides, from the distance $l_{i+1}$ and the traveling speed v, the initial phase $\Delta t_{i+1}$ of the tactile sense signal (the waveform f) to be applied to the driven working electrode 1($i$+1) (a delay amount of the phase of the tactile sense signal to be applied to the driven working electrode 1($i$−1), to the phase of the tactile sense signal to be applied to the driven working electrode 1($i$)), as $\Delta t_{i+1} = l_{i+1} / v$.

In the examples illustrated in FIGS. 8 and 9, accordingly, in the case of S($i$−1)=f(t) in which S($i$−1) represents the tactile sense signal applied to the driven working electrode 1($i$−1), the tactile sense signal S($i$) applied to the driven working electrode 1($i$) and the tactile sense signal S($i$+1) applied to the driven working electrode 1($i$+1) are obtained from $S(i) = f(t − \Delta t_i)$, and $S(i+1) = f(t − (\Delta t_i + \Delta t_{i+1}))$, respectively.

Herein, a vibrational motion propagating speed v (for example, v may be a constant) corresponds to an amount corresponding to the tactile sense traveling speed. When the speed v has a considerably large value, the user is hard to explicitly recognize the traveling tactile sense. In the case where the speed v has a considerably small value, it is impossible to obtain an advantageous effect to such an extent that the user can perceive the tactile sense. From the viewpoints described above, it is beneficial that the speed v is about 0.1 cm/s to 100 cm/s. It is more beneficial that the speed v is about 5.0 cm/s to 20 cm/s. In consideration of a fact that a human finger has touch receptors with an about 2 mm-pitch, it is beneficial that the electrode-to-electrode distance l is 2 mm or less. It is more beneficial that the distance is 1 mm or less. On the other hand, the electrode-to-electrode distance l is no limit with regard to the minimum value thereof from the viewpoints of ensuring and improving the function of presenting the tactile sense. However, further improvement in function of presenting a tactile sense to a human being cannot be expected even when the electrode-to-electrode distance l is set to be considerably small. Moreover, the considerably small electrode-to-electrode distance l is not beneficial because the manufacturing cost increases. From the viewpoints described above, the electrode-to-electrode distance l is beneficially about 1 μm to 2 mm, more beneficially about 10 μm to 1 mm.

Finally, the drive signal output unit 204 applies the tactile sense signals (S($i$−1), S($i$), S($i$+1)) to which the initial phases decided in step S4 are applied, to the driven working electrodes 1 (1($i$−1), 1($i$), 1($i$+1)), respectively. Herein, the drive signal output unit 204 does not necessarily apply the tactile sense signal to the working electrode other than the driven working electrode (i.e., the working electrode disposed out of the region A on the tactile sense presentation unit) (step S5). The drive signal output unit 204 may output a single tactile sense signal (a tactile sense signal having no initial phase added thereto) by delaying a tactile sense signal output timing for each driven working electrode, in consideration of the initial phase. Alternatively, the drive signal output unit 204 may previously prepare a waveform of a tactile sense signal for each driven working electrode while taking the initial phase into consideration, and may output the tactile sense signals substantially at the same time to all the driven working electrodes.

With the operations described above, the tactile sense signals having the waveforms illustrated in FIG. 9 are applied to the driven working electrodes 1 (1($i$−1), 1(i), 1($i$−1)) in the state illustrated in FIG. 8.

As described above, the tactile sense presentation device 100 generates electrical vibrations based on electric signals which are identical in waveform with one another, on the plurality of working electrodes 1 of the tactile sense presentation unit 10 at different timings (with phase differences). Thus, the tactile sense presentation device 100 presents the vibrations which propagate the tactile sense presentation unit 10 along the predetermined direction (the direction of the arrow dir in FIG. 8) at the predetermined speed v, to the tactile sense presentation target site (the finger 5). Hence, the tactile sense presentation device 100 is capable of presenting an explicit tactile sense even when the tactile sense presentation target site 5 relatively remains stationary to the tactile sense presentation unit 10 (i.e., without a necessity for the user to move his/her finger). Accordingly, the tactile sense presentation device 100 is capable of presenting an explicit tactile sense to the user with good sensitivity even when the tactile sense presentation unit 10 has a comparatively limited area or even at an end or corner of the tactile sense presentation unit 10. Moreover, the tactile sense presentation device 100 is capable of making a user to perceive vibrational motion which travels along a predetermined direction. Therefore, the tactile sense presentation device 100 is capable of presenting a tactile sense to be obtained when the user moves his/her finger along a specific direction.

Additionally, the tactile sense presentation device 100 outputs the electric signal "directly" to the human body site, thereby presenting the "tactile sense" to the user. Therefore, the tactile sense presentation device 100 is capable of presenting an explicit tactile sense to the user with a comparatively compact configuration and with reduced power consumption. Herein, the term "tactile sense" refers to a feel of perception by a sense of touch. Moreover, the term "directly" refers to a state of acting an electric signal on a human body site without using a different device (e.g., a motor) irrespective of contact or non-contact. The term "directly" is not limited to a state that an electric signal output terminal is in contact with a human being. Even in the state that the electric signal output terminal (the working electrode 1) is not in contact with a human being with the insulator 4 therebetween, the tactile sense presentation device 100 outputs the electric signal "directly" to the human body site in such a sense that an electric signal from the signal source (the control unit 20) is acted on the human body site without the use of a different device (e.g., a motor).

In the tactile sense presentation device 100, an insulating film including the insulator 4 is formed on at least some of the working electrodes 1 of the tactile sense presentation unit 10. The working electrode 1 having the insulating film formed immediately thereon presents a tactile sense based on electrostatic attraction to a user. Therefore, the tactile sense presentation device 100 is improved in resistance to wear and damage because the working electrode 1 is protected by the insulating film.

Moreover, the transparent tactile sense presentation unit 10 of the tactile sense presentation device 100 can be disposed along the screen of the display device. Thus, the tactile sense presentation device 100 receives information of a tactile sense corresponding to an image displayed on the display device, thereby changing characteristics of the tactile sense represented in each partial region on the tactile sense presentation unit 10, in accordance with the displayed image. Therefore, the tactile sense presentation device 100 is capable of presenting, to a user, tactile sense information collaborated with visual information. In this case, each of the working electrode 1, the first conductor 2, the second conductor 3 and the insulating member 4 may be made of a material that allows a visible light beam to pass therethrough, and examples of such a material may include ITO, ZnO and glass. Herein, the material for the working electrode 1, first conductor 2, second conductor 3 and insulating member 4 is not limited to a material that allows a visible light beam to pass therethrough. In other words, each of the working electrode 1, the first conductor 2, the second conductor 3 and the insulating member 4 is not limited with regard to the transparency thereof.

Moreover, the tactile sense presentation unit 10 may be laminated on the screen of the display device.

Examples of the screen, on which the tactile sense presentation unit 10 is laminated, of the display device may include a liquid crystal display panel, an organic EL display panel, a plasma display panel, and the like. The tactile sense presentation unit 10 is laminated on the display panel so as not to hinder a user from visually identifying an image displayed on the display panel. The use of the "transparent" tactile sense presentation unit 10 allows the user to visually identify the image displayed on the display panel, with ease even in the case of laminating the tactile sense presentation unit 10 on the display panel.

The term "transparent" refers to a state that a human being can visually identify an image displayed on a display panel. The tactile sense presentation unit 10 is "transparent" in the case where the user can visually identify the image displayed on the display panel even when the tactile sense presentation unit 10 has a low transmittance of light having a wavelength in a visible light region. The tactile sense presentation unit 10 may be configured as follows. For example, ITO formed on a PET film by sputtering is used as an electroconductive material, and IGZO formed as in the similar manner by sputtering is used as a semiconductor material.

The tactile sense presentation unit 10 is not necessarily transparent in the wavelength range of visible light, but may be made of a metal such as Ag or a carbon fiber which is thin to such an extent that a human being cannot visually identify the material. Moreover, a metal or a carbon fiber which can be visually identified by a human being may also be used as long as the human being can visually identify an image displayed on the display panel.

In the case of an active matrix-type display that drives pixels using transistors arranged in an array form (a back plane) (e.g., an active matrix liquid crystal display or an organic EL display), the tactile sense presentation unit 10 may be configured to be an active matrix type (see FIGS. 21 and 22), and signal generation portions (elements 2, 3, 7 and the like in FIG. 22) may be formed on the back plane of the display device. The formation of the signal generation portions on the back plane is beneficial because of the following reason. That is, there is no necessity to form constituent elements of the signal generation portions, such as a transistor, with a transparent material, which leads to gain a wide choice of materials. In this case, the control unit 20 transmits an electric signal (a tactile sense signal) from the signal generation portion of the tactile sense presentation unit 10 to the working electrode 1 through a contact via or the like.

2-3. Modification Examples

It is apparent from the structural features illustrated in FIGS. 1 to 3 that the tactile sense presentation unit 10 can be operated as a capacitive touch panel (touch sensor). Accordingly, the tactile sense presentation device 100 is also capable of serving as a touch panel in such a manner that the control unit 20 is allowed to have a function of making the tactile sense presentation unit 10 to function as a touch panel.

Hereinafter, description will be given of a tactile sense presentation device 100v with a touch panel function. The tactile sense presentation device 100v detects a partial region, where a tactile sense presentation target site 5 such as a user's finger is on, on the tactile sense presentation unit 10 by means of the touch sensor function, prior to the presentation of a tactile sense. Then, the tactile sense presentation device 100v decides the region where the tactile sense presentation site 5 is on, as a tactile sense presentation region, and presents the tactile sense to only the region. Herein, there is no necessity to apply a tactile sense signal for presenting a tactile sense to a working electrode in a region, where the presence of the tactile sense presentation target site 5 is not detected, on the tactile sense presentation unit 10. Thus, it is possible to present a tactile sense with further enhanced energy efficiency, and to reduce electric power to be consumed by the tactile sense presentation device in order to present the tactile sense. Additionally, the tactile sense presentation device 100v is capable of presenting a feedback based on a tactile sense with respect to the touch by the user, with good efficiency.

The touch panel function can be realized in such a manner that a different touch panel is superposed on the tactile sense presentation unit 10.

Moreover, the touch panel function can also be realized in such a manner that at least some of the working electrodes 1 of the tactile sense presentation unit 10 are used as a capacitive touch sensor. For example, the working electrode 1 for presenting a tactile sense may be temporarily used as an electrode for touch sensing. Moreover, some of the working electrodes 1 may be used for touch sensing only. Thus, it is possible to keep a short distance between the tactile sense presentation unit 10 and the tactile sense presentation target site, and to present an explicit tactile sense with good sensitivity and with low power consumption. Alternatively, it is possible to keep a short distance between the touch panel and the user's finger, and to detect a position of the finger with good accuracy.

Figure 11:
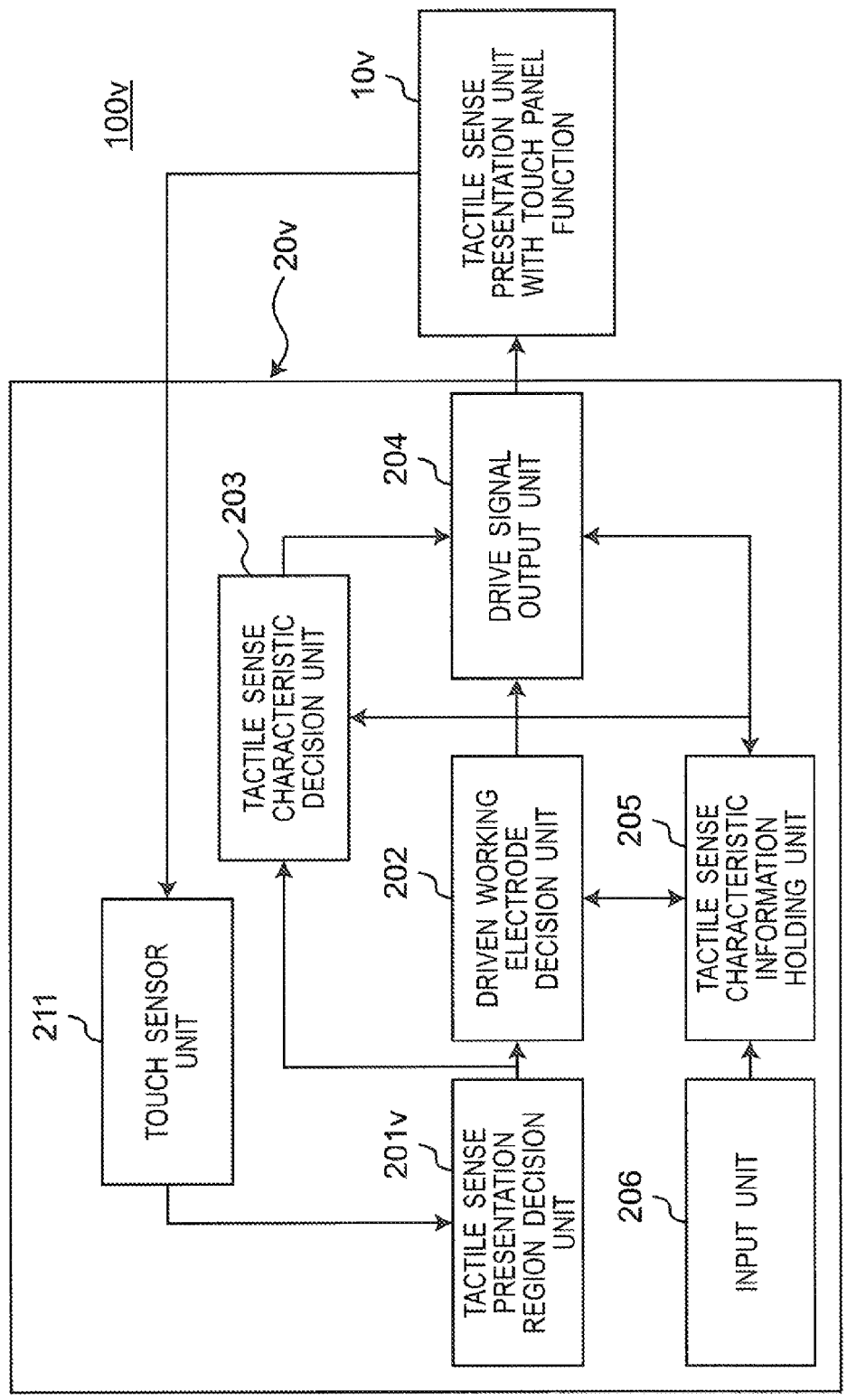
FIG. 11 is a block diagram of a modification example of the tactile sense presentation device according to the first embodiment of the present invention (a tactile sense presentation device with a touch panel function).

FIG. 11 is a block diagram of a configuration of the tactile sense presentation device 100v with the touch panel function (hereinafter, simply referred to as the "tactile sense presentation device 100v"). In the tactile sense presentation device 100v, blocks which are equal in configuration to those of the tactile sense presentation device 100 are denoted with the identical reference signs, and therefore the detailed description thereof will not be given here.

As illustrated in FIG. 11, the tactile sense presentation device 100v includes a tactile sense presentation unit 10v and a control unit 20v.

The tactile sense presentation unit 10v may be similar in structural feature to the tactile sense presentation unit 10. In the tactile sense presentation unit 10v, however, some of or all of working electrodes 1 temporarily function as a touch sensor. In the tactile sense presentation unit 10v, alternatively, some of the working electrodes 1 function as a touch sensor.

The control unit 20 includes a tactile sense presentation region decision unit 201v, a driven working electrode decision unit 202, a tactile sense characteristic decision unit 203, a drive signal output unit 204, a tactile sense characteristic information holding unit 205 and an input unit 206. The control unit 20v also includes a touch sensor unit 211 making the tactile sense presentation unit 10v to function as a touch panel.

Each of the tactile sense presentation region decision unit 201v and the touch sensor unit 211 may be realized with a processor that executes a program for realizing the function of each unit, as well as a memory that holds the program and various data. Alternatively, each unit may be realized with a dedicated circuit.

The touch sensor unit 211 makes at least some of the working electrodes 1 of the tactile sense presentation unit 10v to at least temporarily operate as a touch sensor. Moreover, the touch sensor unit 211 detects a tactile sense presentation target site 5 which is contact with or in proximity to the tactile sense presentation unit 10v, and notifies the tactile sense presentation region decision unit 201v of the position of the tactile sense presentation target site 5.

The tactile sense presentation region decision unit 201v decides a tactile sense presentation region on the basis of the positional information notified from the tactile sense presentation region decision unit 201v. For example, the tactile sense presentation region to be decided by the tactile sense presentation region decision unit 201v is a region having predetermined dimensions to cover the position indicated by the positional information.

Figure 12:
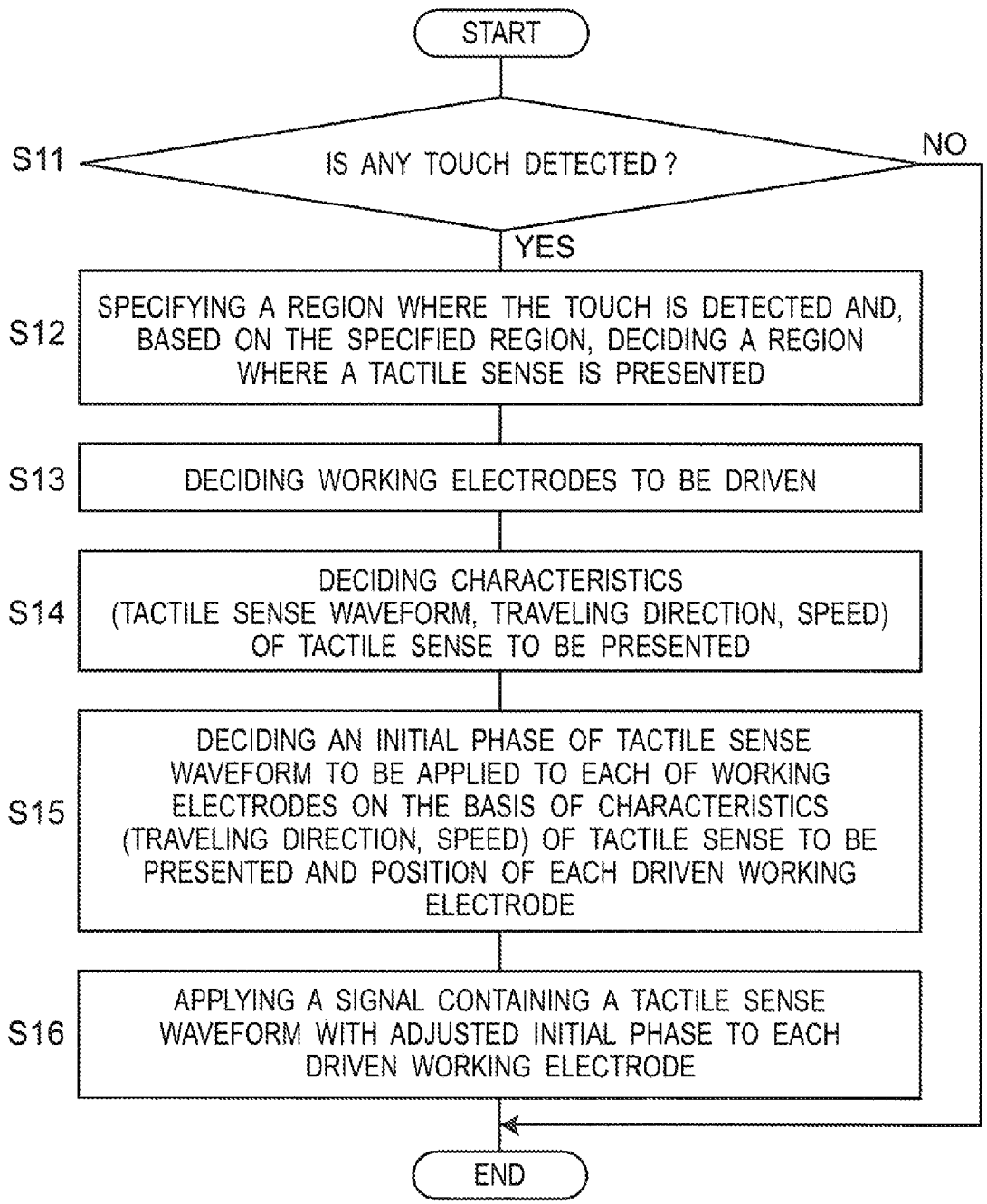
FIG. 12 is a flowchart of processing to be executed by the tactile sense presentation device with the touch panel function according to the first embodiment of the present invention.

FIG. 12 is a flowchart of processing to be executed by the tactile sense presentation device 100v in order to present a tactile sense to the proximate region to the touched position, upon detection of the touch.

First, the touch sensor unit 211 of the control unit 20 determines whether the tactile sense presentation target site 5 such as the user's finger is in proximity to the tactile sense presentation unit 10 (step S11).

When the touch sensor unit 211 detects the presence of the tactile sense presentation target site 5 ("YES" in step S11), then, the touch sensor unit 211 notifies the tactile sense presentation region decision unit 201v of information about a position of the detected tactile sense presentation target site 5.

The tactile sense presentation region decision unit 201v decides a tactile sense presentation region on the basis of the positional information notified by the touch sensor unit 211 (step S12).

In FIG. 12, steps S13 to S16 may be similar in details to steps S2 to S5 described with reference to FIG. 10; therefore, the description thereof will not be given here.

As described above, the tactile sense presentation device 100v includes position identifying means for detecting the tactile sense presentation target site 5 which is in contact with or in proximity to the tactile sense presentation unit 10v, and identifying a position of the tactile sense presentation target site 5. Thus, the tactile sense presentation device 100v is capable of presenting a tactile sense to only the partial region covering the position of the tactile sense presentation target site 5. In other words, upon presentation of the tactile sense to the partial region covering the position of the tactile sense presentation target site 5, there is no necessity to apply a tactile sense signal for presenting the tactile sense to the working electrode in the region, where the presence of the tactile sense presentation target site 5 is not detected, on the tactile sense presentation unit 10. Thus, the tactile sense presentation device 100v allows reduction in power consumption upon presentation of a tactile sense.

In the tactile sense presentation device 100v, the position identifying means includes at least some of the working electrodes 1 of the tactile sense presentation unit 10v, and the touch sensor unit 211 that makes the working electrodes 1 to at least temporarily operate as a touch sensor, thereby making the tactile sense presentation unit 10v to function as a touch panel.

In the tactile sense presentation device 100v, the working electrode 1 for presenting a tactile sense and the electrode functioning as a touch sensor (hereinafter, referred to as the "touch electrode") are arranged on the single plane. Examples of the aspect of arranging the working electrode 1 and the touch electrode on the single plane include an aspect of making the working electrode 1 to temporarily function as a touch electrode (temporal division), and an aspect of arranging the touch electrode in a single plane form independently of the working electrode 1 (spatial division). Each of the aspects allows reduction in thickness as compared with the case where the tactile sense presentation unit 10v is formed by laminating the touch panel and the tactile sense presentation unit which are prepared independently of each other. As compared with the laminating aspect, moreover, the tactile sense presentation unit 10v is capable of presenting an explicit tactile sense to the tactile sense presentation target site 5 with low power consumption while detecting the position of the tactile sense presentation target region with good sensitivity because of the following reason. That is, the tactile sense presentation unit 10v presents the tactile sense to the tactile sense presentation target site 5 located considerably close to the working electrode 1 in a direction perpendicular to the screen while restricting the tactile sense presentation region to a proximate region to the position of the tactile sense presentation target site. Accordingly, the tactile sense presentation device 100v allows reduction in thickness, and also allows reduction in power consumption while providing an explicit tactile sense to a required region.

3. Second Embodiment 3-1. Configuration

Hereinafter, description will be given of a tactile sense presentation device 100 according to a second embodiment corresponding to one aspect of the present invention.

The tactile sense presentation device 100 according to the second embodiment is identical in configuration to the tactile sense presentation device 100 according to the first embodiment; therefore, the description of the configuration will not be given here.

In this embodiment, the tactile sense presentation device 100 generates, for a user's finger (a tactile sense presentation target site), electrical stimulations which travel back and forth on a tactile sense presentation unit along a predetermined direction with a lapse of time, thereby making the user to perceive vibrational motion which travels back and forth on the tactile sense presentation unit along the predetermined direction, at a position immediately below his/her finger. The vibrational motion which travels back and forth along the predetermined direction is realized as follows. That is, in the tactile sense presentation device, the tactile sense presentation unit includes a plurality of extremely minute working electrodes which are adjacent to one another, and the working electrodes generate vibrational electrical stimulations which are identical in shape with one another, with a phase difference corresponding to the back-and-forth traveling speed (a timing difference). Therefore, this embodiment allows presentation of a tactile sense to be obtained when a user repeatedly moves his/her body site (e.g., finger) so as to identify the tactile sense by tracing an object over plural times with his/her body site, although the body site (e.g., finger) actually remains stationary. Accordingly, it is possible to repeatedly present an explicit tactile sense with good sensitivity even in a tactile sense presentation unit having a small area.

In order to realize the vibrational motion which travels back and forth described above, the tactile sense presentation device 100 according to this embodiment is configured as follows. That is, a tactile sense characteristic decision unit 203 of a control unit 20 decides, in addition to characteristics (a tactile sense signal waveform, a traveling direction and a traveling speed) of a tactile sense to be presented in a tactile sense presentation region, a back-and-forth traveling cycle on the basis of tactile sense characteristic information to be held by a tactile sense characteristic information holding unit 205 with associated with a partial region on the tactile sense presentation unit 10.

In this embodiment, a drive signal output unit 204 decides an initial phase of a tactile sense signal to be applied to each driven working electrode 1, for each of a forward route and a backward route of the back-and-forth traveling motion, on the basis of the characteristics (particularly, the traveling direction, the traveling speed and the back-and-forth traveling cycle) of the tactile sense, and information about the disposed position of the working electrode 1 held by the tactile sense characteristic information holding unit 205. Then, the drive signal output unit 204 applies the tactile sense signal to each driven working electrode on the basis of the decided initial phase.

The tactile sense characteristic information holding unit 205 holds the characteristics (the tactile sense signal, the traveling direction, the traveling speed and the back-and-forth traveling cycle) of the tactile sense to be presented in the partial region on the tactile sense presentation unit 10, as well as the information about the disposed position of each working electrode 1 of the tactile sense presentation unit 10.

3-2. Operations

Hereinafter, description will be given of operations of the tactile sense presentation device 100 according to the second embodiment. It is assumed in the following description that the tactile sense presentation unit 10 of the tactile sense presentation device 100 is transparent and is disposed on a user-side screen of a display device.

Figure 13:
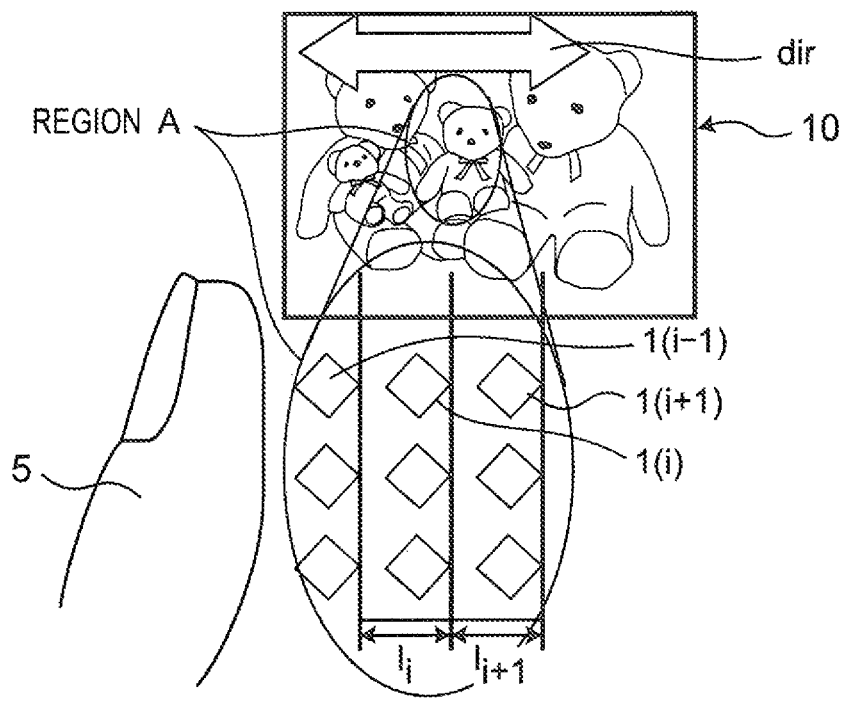
FIG. 13 is a diagram illustrating the layout of working electrodes in a tactile sense presentation region.
Figure 14:
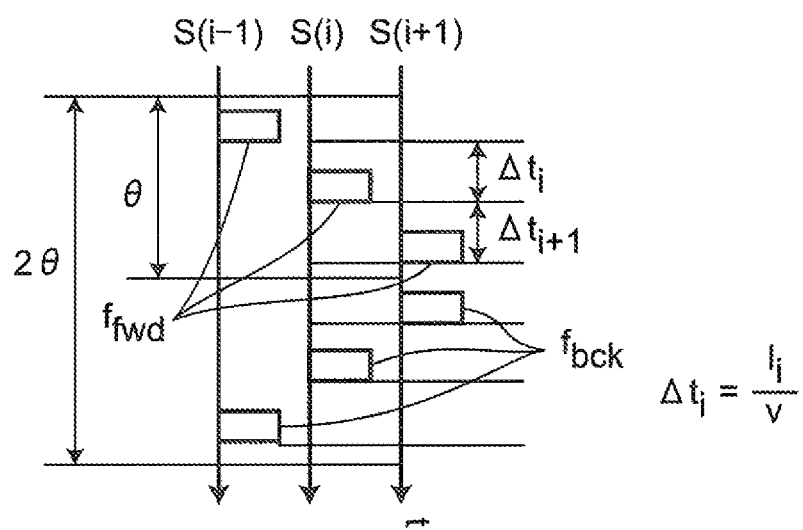
FIG. 14 is a diagram illustrating tactile sense signals to be applied to the respective working electrodes in the tactile sense presentation region.
Figure 15:
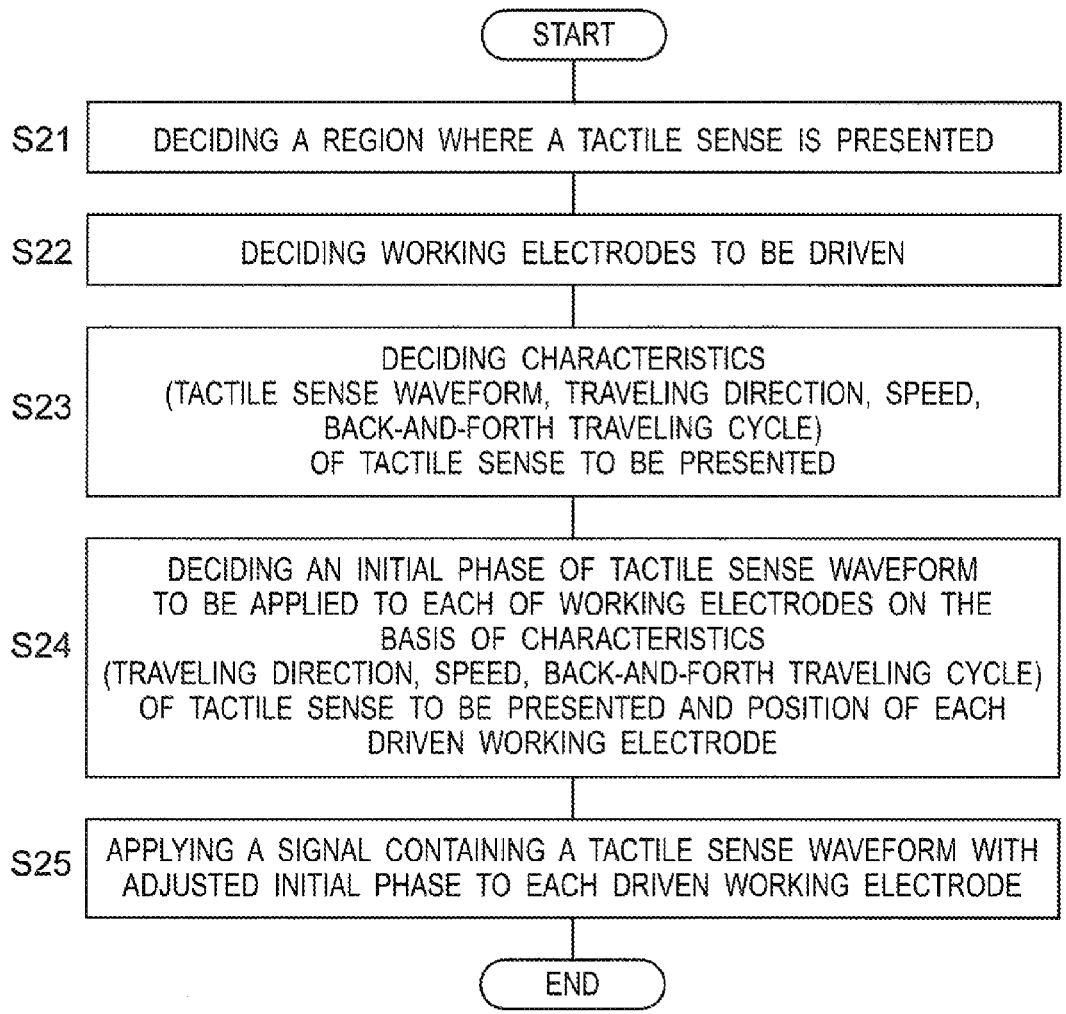
FIG. 15 is a flowchart of processing to be executed by a tactile sense presentation device according to a second embodiment of the present invention.

FIG. 13 is a diagram illustrating a state that a user touches with his/her finger 5 a region A on the tactile sense presentation unit 10. Herein, the plurality of working electrodes 1 (1($i-1$), 1($i$), 1($i+1$)) is disposed on the region A touched by the user. FIG. 14 is a diagram illustrating tactile sense signals to be applied to the driven working electrodes 1 (1($i-1$), 1($i$), 1($i+1$)) in the region A. FIG. 15 is a flowchart of processing to be executed by the tactile sense presentation device 100 in order to present a tactile sense in the region A.

Among steps of the flowchart illustrated in FIG. 15, step S21, step S22 and step S25 are similar in details to step S1, step S2 and step S5 described with reference to FIG. 10, respectively; therefore, the description thereof will not be given here.

When the driven working electrode decision unit 202 decides the driven working electrodes 1 (step S22), the tactile sense characteristic decision unit 203 acquires the tactile sense characteristic information about the region A from the tactile sense characteristic information holding unit 205, and decides the characteristics of a tactile sense to be presented in the region A (step S23). Herein, the tactile sense characteristic information acquired by the tactile sense characteristic decision unit 203 is information about the waveform of the tactile sense signal, the traveling direction of the tactile sense, the traveling speed of the tactile sense, and the back-and-forth traveling cycle. In the example illustrated in FIG. 13, the decided waveform of the tactile sense signal is a waveform f (FIG. 14). Moreover, the decided traveling direction and speed are the direction (a direction of an arrow dir) and the speed (v (FIG. 14)) represented by a vector dir. Further, the back-and-forth traveling cycle is represented by $2\theta$ (FIG. 14). Herein, the waveforms f may be identical with each other, or may be different from each other as two waveforms which are opposite in traveling direction to each other in the forward route (a waveform $f_{fwd}$) and the backward route (a waveform $f_{bck}$) of the back-and-forth traveling motion.

Herein, the tactile sense characteristic decision unit 203 may decide the back-and-forth traveling cycle 2θ from the traveling speed v, and a length L of the tactile sense presentation region along the traveling direction dir. It is assumed herein that a finger (a tactile sense presentation target site 5) has a width of 1 cm. In the case of presenting a tactile sense of a 1 cm-square button, the length L may be set at 3 cm derived from a sum of 1 cm corresponding to the width of the button and 2 cm which is twice the width of the finger. In the case of presenting a tactile sense of a 10 cm-square stone to three fingers, the length L may be set at 16 cm derived from a sum of 10 cm corresponding to the width of the stone and 6 cm which is twice 3 cm corresponding to the total width of the three fingers. The back-and-forth traveling motion is defined as such back-and-forth traveling motion that the tactile sense travels back and forth a route length L at a speed v. The back-and-forth traveling cycle 2θ may be defined as a time to be required for the tactile sense which travels back and forth the route length L at the speed v ($2\theta = 2L/v(s)$).

Next, the drive signal output unit 204 of the control unit 20 decides an initial phase of the tactile sense signal corresponding to the tactile sense characteristic decided by the tactile sense characteristic decision unit 203, for each of the forward route and the backward route of the back-and-forth traveling motion, with regard to each of the driven working electrodes 1 decided by the driven working electrode decision unit 202. Then, the drive signal output unit 204 applies the tactile sense signal to each driven working electrode on the basis of the decided initial phase (step S24).

Specifically, the drive signal output unit 204 specifies a timing of applying electrical stimulations (vibrations to be presented) to the user with each driven working electrode (the electrode 1($i-1$), the electrode 1($i$) or the electrode 1($i-1$)), as the initial phase of the tactile sense signal to be applied to each driven working electrode (the electrode 1($i-1$), the electrode 1($i$) or the electrode 1($i-1$)) in each of the forward route and the backward route, on the basis of the traveling direction, the traveling speed and the back-and-forth traveling cycle among the tactile sense characteristics decided by the tactile sense characteristic decision unit 203, in consideration of the disposed position of each driven working electrode.

In the example illustrated in FIG. 13, the driven working electrode 1($i-1$) and the driven working electrode 1($i$) are different from each other, in the disposed position along the traveling direction (the arrow dir), by a distance $l_i$. Likewise, the driven working electrode 1($i$) and the driven working electrode 1($i+1$) are different from each other, in the disposed position along the traveling direction (the arrow dir), by a distance $l_{i+1}$. Therefore, the drive signal output unit 204 decides, from the distance $l_i$ and the traveling speed v, the initial phase $\Delta t_i$ of the tactile sense signal (the waveform f) applied to the driven working electrode 1($i$), as $\Delta t_i = l_i/v$. Likewise, the drive signal output unit 204 decides, from the distance $l_{i+1}$ and the traveling speed v, the initial phase $\Delta t_{i+1}$ of the tactile sense signal (the waveform f) applied to the driven working electrode 1($i-1$), as $\Delta t_{i+1} = l_{i+1}/V$.

In the examples illustrated in FIGS. 13 and 14, accordingly, the tactile sense signals S($i-1$) applied to the driven working electrodes 1($i-1$) are obtained from $$S(i-1)=f(t)(t:0 \le t \le \theta), \text{ and}$$

$$S(i-1)=f(-t+2\theta)(t:\theta \le t \le 2\theta).$$

In this case, the tactile sense signals S(i) applied to the driven working electrodes 1($i$) and the tactile sense signals S(i+1) applied to the driven working electrodes 1($i+1$) are obtained from $$S(i)=f(t-\Delta t_i)(t:0 \le t \le \theta),$$

$$S(i)=f(-t+2\theta-\Delta t_i)(t:\theta \le t \le 2\theta),$$

$$S(i+1)=f(t-(\Delta t_i+\Delta t_{i+1}))(t:0 \le t \le \theta), \text{ and}$$

$$S(i+1)=f(-t+2\theta-(\Delta t_i+\Delta t_{i+1}))(t:\theta \le t \le 2\theta),$$

respectively.

Herein, a suitable value of the vibrational motion propagating speed v is the same as the value described in relation to the first embodiment. Moreover, a suitable distance of the electrode-to-electrode distance l is the same as the value described in relation to the first embodiment.

Finally, the drive signal output unit 204 applies the tactile sense signals (S($i-1$), S($i$), S($i+1$)) to which the initial phases decided in step S4 are added, to the driven working electrodes 1 (1($i-1$), 1($i$), 1($i+1$)), respectively. Herein, the drive signal output unit 204 does not necessarily apply the tactile sense signal to the working electrode other than the driven working electrode (i.e., the working electrode disposed out of the region A on the tactile sense presentation unit) (step S5). The drive signal output unit 204 may output a single tactile sense signal (a tactile sense signal having no initial phase added thereto) by delaying a tactile sense signal output timing for each driven working electrode, in consideration of the initial phase. Alternatively, the drive signal output unit 204 may previously prepare a waveform of a tactile sense signal for each driven working electrode while taking the initial phase into consideration, and may output the tactile sense signals substantially at the same time to all the driven working electrodes.

With the operations described above, the tactile sense signals having the waveforms illustrated in FIG. 14 are applied to the driven working electrodes 1 (1($i-1$), 1($i$), 1($i+1$)) in the state illustrated in FIG. 13.

As described above, the tactile sense presentation device 100 generates the electrical vibrations based on electric signals which are identical in waveform with one another, on the plurality of working electrodes 1 of the tactile sense presentation unit 10 at different timings (with phase differences). Thus, the tactile sense presentation device 100 presents the vibrations which travel back and forth on the tactile sense presentation unit 10 along the predetermined direction (the direction of the arrow dir in FIG. 8) at the predetermined speed v, to the tactile sense presentation target site (the finger 5). Hence, the tactile sense presentation device 100 is capable of presenting an explicit tactile sense which travels back and forth, to the user (for example, over plural times) even when the tactile sense presentation target site 5 relatively remains stationary to the tactile sense presentation unit 10 (i.e., without a necessity for the user to move his/her finger). Accordingly, the tactile sense presentation device 100 is capable of presenting an explicit tactile sense to the user with good sensitivity even when the tactile sense presentation unit 10 has a comparatively limited area or even at an end or corner of the tactile sense presentation unit 10. Moreover, the tactile sense presentation device 100 is capable of making the user to perceive the vibrational motion which travels back and forth along the predetermined direction. Therefore, the tactile sense presentation device 100 is capable of presenting to the user a tactile sense to be obtained when the user moves his/her finger back and forth along the specific direction.

The tactile sense presentation device 100 according to the second embodiment is also capable of presenting an explicit tactile sense to the user with a comparatively compact configuration and with reduced power consumption.

Also in the tactile sense presentation device 100 according to the second embodiment, an insulating film formed on the working electrode 1 protects the working electrode 1. Thus, the tactile sense presentation device 100 is improved in resistance to wear and damage.

Also in the tactile sense presentation device 100 according to the second embodiment, the transparent tactile sense presentation unit 10 is used for receiving information of a tactile sense corresponding to an image displayed on the display device, thereby changing characteristics of the tactile sense presented in each partial region on the tactile sense presentation unit 10, in accordance with the displayed image.

Also in the tactile sense presentation device 100 according to the second embodiment, the tactile sense presentation unit 10 may be laminated on the screen of the display device.

Also in the tactile sense presentation device 100 according to the second embodiment, when the display device is of an active matrix type, the tactile sense presentation unit 10 may be configured to be an active matrix type (see FIGS. 21 and 22), and signal generation portions (elements 2, 3, 7 and the like in FIG. 22) may be formed on a back plane of the display device.

3-3. Modification Examples

Just as the first embodiment, a modification example in which a touch panel function is added to the tactile sense presentation unit 10 can be implemented in the second embodiment.

Hereinafter, description will be given of a tactile sense presentation device 100v with the touch panel function which is the modification example of the second embodiment. The tactile sense presentation device 100v detects a partial region, where a tactile sense presentation target site 5 such as a user's finger is on, on the tactile sense presentation unit 10 by means of the touch sensor function, prior to the presentation of a tactile sense. Then, the tactile sense presentation device 100v decides the region where the tactile sense presentation site 5 is on, as a tactile sense presentation region, and presents the tactile sense to only the region. Herein, there is no necessity to apply a tactile sense signal for presenting the tactile sense to a working electrode in a region, where the presence of the tactile sense presentation target site 5 is not detected, on the tactile sense presentation unit 10. Thus, it is possible to present a tactile sense with further enhanced energy efficiency, and to reduce electric power to be consumed by the tactile sense presentation device in order to present the tactile sense. Additionally, the tactile sense presentation device 100v is capable of presenting a feedback based on a tactile sense with respect to the touch by the user, with good efficiency.

Also in this modification example, the touch panel function can be realized in such a manner that a different touch panel is superposed on the tactile sense presentation unit 10.

Moreover, the touch panel function can also be realized in such a manner that at least some of the working electrodes 1 of the tactile sense presentation unit 10 are used as a capacitive touch sensor. For example, the working electrode 1 for presenting a tactile sense may be temporarily used as an electrode for touch sensing. Moreover, some of the working electrodes 1 may be used for touch sensing only. Thus, it is possible to keep a short distance between the tactile sense presentation unit 10 and the tactile sense presentation target site, and to present an explicit tactile sense with good sensitivity and with low power consumption. Alternatively, it is possible to keep a short distance between the touch panel and the user's finger, and to detect a position of the finger with good accuracy.

The tactile sense presentation device 100v which is the modification example of the second embodiment is equal in configuration to the tactile sense presentation device 100v which is the modification example of the first embodiment; therefore, the description of the configuration will not be given here.

Figure 16:
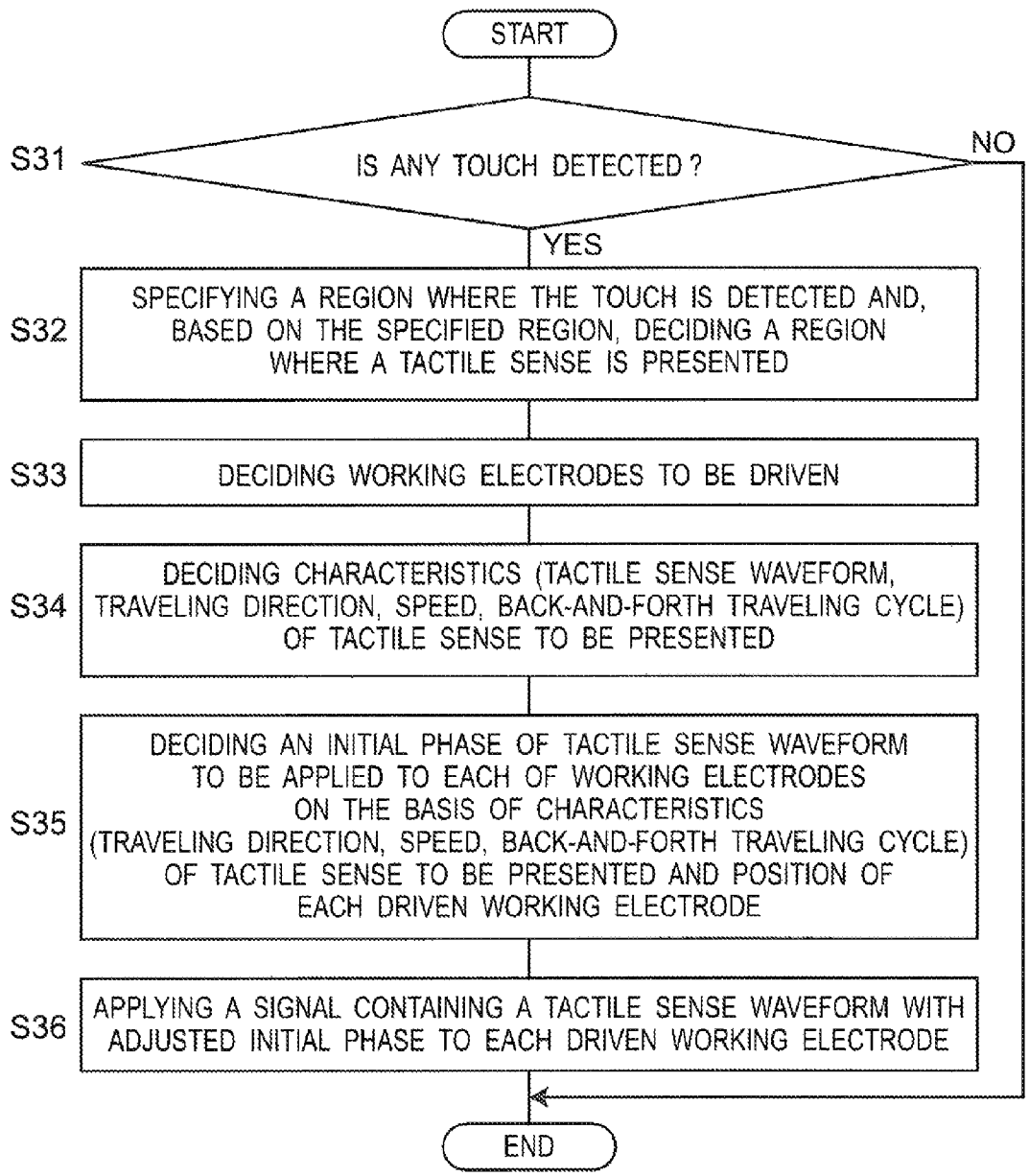
FIG. 16 is a flowchart of processing to be executed by a modification example of the tactile sense presentation device according to the second embodiment of the present invention (a tactile sense presentation device with a touch panel function).

FIG. 16 is a flowchart of processing to be executed by the tactile sense presentation device 100v in order to present a tactile sense to the proximate region to the touched position, upon detection of the touch.

In FIG. 16, steps S31 to S33 as well as step S36 may be similar in details to steps S11 to S13 as well as step S16 described with reference to FIG. 12, respectively. In FIG. 16, moreover, steps S34 and S35 are similar in details to steps S23 and S24 described with reference to FIG. 15, respectively. Therefore, the description of the respective steps will not be given here.

Also in the modification example of the second embodiment, as described above, the tactile sense presentation device 100v includes position identifying means for detecting the tactile sense presentation target site 5 which is in contact with or in proximity to the tactile sense presentation unit 10v, and identifying a position of the tactile sense presentation target site 5. Thus, the tactile sense presentation device 100v is capable of presenting a tactile sense to only the partial region covering the position of the tactile sense presentation target site 5. In other words, upon presentation of the tactile sense to the partial region covering the position of the tactile sense presentation target site 5, there is no necessity to apply a tactile sense signal for presenting the tactile sense to the working electrode in the region, where the presence of the tactile sense presentation target site 5 is not detected, on the tactile sense presentation unit 10. Thus, the tactile sense presentation device 100v allows reduction in power consumption upon presentation of a tactile sense.

4. Third Embodiment 4-1. Configuration

Hereinafter, description will be given of a tactile sense presentation device 100 according to a third embodiment corresponding to one aspect of the present invention. The third embodiment describes a configuration for concurrently presenting tactile senses to a plurality of tactile sense presentation regions.

The tactile sense presentation device 100 according to the third embodiment is equal in configuration to the tactile sense presentation device 100 according to each of the first and second embodiments; therefore, the description of the configuration will not be given here.

The tactile sense presentation device 100 according to this embodiment concurrently presents tactile senses to a plurality of tactile sense presentation regions while establishing a specific relationship (to be described later) between characteristics (e.g., a traveling speed and/or a traveling direction) of the tactile sense presented in the first tactile sense presentation region and characteristics of the tactile sense presented in the second tactile sense presentation region.

Examples of the specific relationship include such a relationship that the first traveling speed which is the characteristic of the first tactile sense presented in the first tactile sense presentation region is identical with the second traveling speed which is the characteristic of the second tactile sense presented in the second tactile sense presentation region (a first relationship).

Examples of the specific relationship also include such a relationship that the first traveling direction which is the characteristic of the first tactile sense presented in the first tactile sense presentation region and the second traveling direction which is the characteristic of the second tactile sense presented in the second tactile sense presentation region are on a single straight line (a second relationship).

Examples of the specific relationship also include such a relationship that the first traveling direction which is the characteristic of the first tactile sense presented in the first tactile sense presentation region and the second traveling direction which is the characteristic of the second tactile sense presented in the second tactile sense presentation region are on a single straight line and are opposite to each other (a first example of the second relationship).

Examples of the specific relationship also include such a relationship that the first traveling direction which is the characteristic of the first tactile sense presented in the first tactile sense presentation region and the second traveling direction which is the characteristic of the second tactile sense presented in the second tactile sense presentation region are on a single straight line and are opposite to each other, the first traveling direction extends from the first tactile sense presentation region toward the second tactile sense presentation region, and the second traveling direction extends from the second tactile sense presentation region toward the first tactile sense presentation region (a second example of the second relationship). In this case, a user can perceive a tactile sense as if an object is scaled down toward a midpoint between the first and second tactile sense presentation regions.

Examples of the specific relationship also include such a relationship that the first traveling direction which is the characteristic of the first tactile sense presented in the first tactile sense presentation region and the second traveling direction which is the characteristic of the second tactile sense presented in the second tactile sense presentation region are on a single straight line and are opposite to each other, the first traveling direction is opposite to the direction extending from the first tactile sense presentation region toward the second tactile sense presentation region, and the second traveling direction is opposite to the direction extending from the second tactile sense presentation region toward the first tactile sense presentation region (a third example of the second relationship). In this case, the user can perceive a tactile sense as if the object is scaled up about the midpoint between the first and second tactile sense presentation regions.

Herein, both the first relationship and the second relationship may be concurrently satisfied, or only one of the relationships may be satisfied. Determination as to which relationship is to be satisfied may be made in conjunction with the movement of an image displayed on the display device, for example. In the case where the image has a partial region which is moved to be scaled down toward a certain point, the tactile sense presentation device 100 may present the above mentioned scaling-down tactile sense in conjunction with the movement of the image. Likewise, in the case where the image has a partial region which is moved to be scaled up about a certain point, the tactile sense presentation device 100 may present the above mentioned scaling-up tactile sense in conjunction with the movement of the image.

4-2. Operations

Hereinafter, description will be given of operations of the tactile sense presentation device 100 according to the third embodiment. It is assumed in the following description that the tactile sense presentation device 100 includes a transparent tactile sense presentation unit 10 which is disposed on a user-side screen of the display device.

Figure 18A:
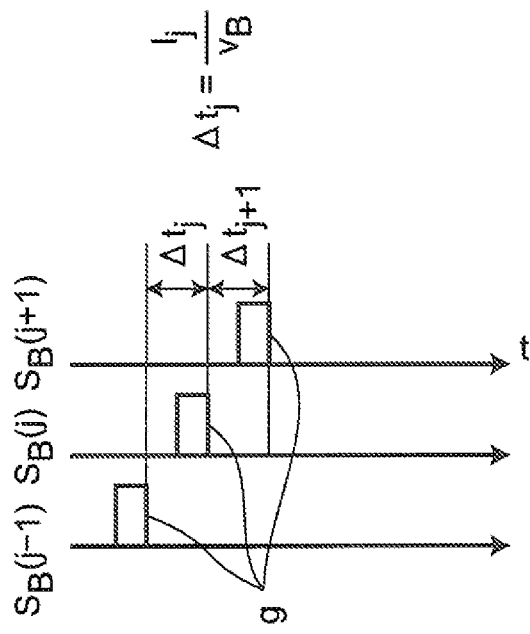
FIGS. 18 A and B are diagrams illustrating tactile sense signals to be applied to the respective working electrodes in the tactile sense presentation regions A and B.
Figure 18B:
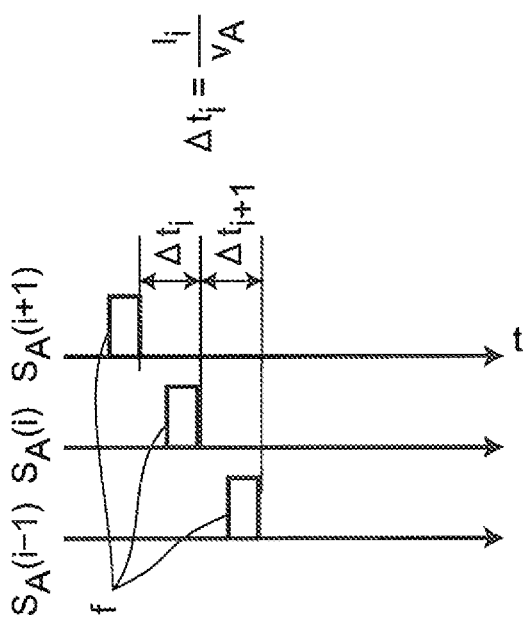

FIG. 17 is a diagram illustrating a state that a user touches with his/her two fingers 5 a region A and a region B on the tactile sense presentation unit 10. Herein, a plurality of working electrodes 1 ($1(i-1)$, $1(i)$, $1(i+1)$) is disposed on the region A touched by the user. Moreover, a plurality of working electrodes 1 ($1((j-1))$, $1(j)$, $1(j+1)$) is disposed on the region B touched by the user. FIG. 18A is a diagram illustrating tactile sense signals to be applied to the plurality of driven working electrodes 1 ($1(i-1)$, $1(i)$, $1(i+1)$) in the region A. FIG. 18B is a diagram illustrating tactile sense signals to be applied to the plurality of driven working electrodes 1 ($1((j-1))$, $1(j)$, $1(j+1)$) in the region B. FIG. 19 is a flowchart of processing to be executed by the tactile sense presentation device 100 in order to present tactile senses in the region A and the region B.

First, a tactile sense presentation region decision unit 201 of a control unit 20 decides a plurality of tactile sense presentation regions (step S41). Herein, the tactile sense presentation region decision unit 201 decides the region A (the first region) and the region B (the second region) as the tactile sense presentation region.

Next, a driven working electrode decision unit 202 of the control unit 20 identifies the working electrodes 1 in the first and second tactile sense presentation regions (the regions A and B), on the basis of information about the layout of the working electrodes 1, the information being held by a tactile sense characteristic information holding unit 205. Then, the driven working electrode decision unit 202 decides the working electrodes 1 in the regions A and B, as the driven working electrode 1 (step S42). In the example illustrated in FIG. 17, the decided driven working electrodes 1 in the region A are the electrodes $1(i-1)$, the electrodes $1(i)$ and the electrodes $1(i+1)$, and the decided driven working electrodes 1 in the region B are the electrodes $1((j-1))$, the electrodes $1(j)$ and the electrodes $1(j+1)$.

Next, a tactile sense characteristic decision unit 203 of the control unit 20 acquires the tactile sense characteristic information about each of the regions A and B, from the tactile sense characteristic information holding unit 205. Then, the tactile sense characteristic decision unit 203 decides the characteristics of the first and second tactile senses to be presented in the regions A and B, respectively (step S43). Herein, the tactile sense characteristic information acquired by the tactile sense characteristic decision unit 203 is information about a waveform of the tactile sense signal, a traveling direction of the tactile sense, and a traveling speed of the tactile sense. In the example illustrated in FIG. 17, with regard to the region A, the decided waveform of the tactile sense signal is a waveform f (FIG. 18A), the decided traveling direction is a direction represented by a vector dira (a direction of an arrow dira), and the decided traveling speed is a speed ($v_A$ (FIG. 18A)). On the other hand, with regard to the region B, the decided waveform of the tactile sense signal is a waveform g (FIG. 18B), the decided traveling direction is a direction represented by a vector dirb (a direction of an arrow dirb), and the decided traveling speed is a speed ($v_B$ (FIG. 18B)).

Herein, the tactile sense characteristic decision unit 203 decides the traveling speeds of the first and second tactile senses and/or the traveling directions of the first and second tactile senses so as to satisfy the specific relationships described above. In the example illustrated in FIG. 17, the tactile sense characteristic decision unit 203 decides the characteristics of the first and second tactile senses such that the traveling speeds of the first and second tactile senses satisfy the first relationship ($v_A = v_B$) and the traveling directions of the first and second tactile senses satisfy the third example of the second relationship.

Next, a drive signal output unit 204 of the control unit 20 decides an initial phase of the tactile sense signal corresponding to the tactile sense characteristic decided by the tactile sense characteristic decision unit 203, for each of the driven working electrodes 1 decided by the driven working electrode decision unit 202 (step S44).

Specifically, the drive signal output unit 204 specifies a timing of applying electrical stimulations (vibrations to be presented) to the user with each driven working electrode (the electrode $1(i-1)$, $1(i)$, $1(i+1)$, $1(j-1)$, $1(j)$, $1(j+1)$), as the initial phase of the tactile sense signal applied to each driven working electrode (the electrode $1(i-1)$, $1(i)$, $1(i+1)$, $1((j-1))$, $1(j)$, $1(j+1)$), on the basis of the traveling direction and the traveling speed among the tactile sense characteristics decided by the tactile sense characteristic decision unit 203, in consideration of the disposed position of each driven working electrode.

Finally, the drive signal output unit 204 applies the tactile sense signals (S(i−1), S(i), S(i+1), S((j−1)), S(j), S(j+1)) to which the initial phases decided in step S44 are applied, to the driven working electrodes 1 ($1(i-1)$, $1(i)$, $1(i+1)$, $1((j-1))$, $1(j)$, $1(j+1)$), respectively. Herein, the drive signal output unit 204 does not necessarily apply the tactile sense signals to the working electrodes other than the driven working electrodes (the working electrodes disposed out of the regions A and B on the tactile sense presentation unit) (step S45). The drive signal output unit 204 may output a single tactile sense signal (a tactile sense signal having no initial phase added thereto) by delaying the tactile sense signal output timing for each driven working electrode, in consideration of the initial phase. Alternatively, the drive signal output unit 204 may previously prepare a waveform of a tactile sense signal for each driven working electrode while taking the initial phase into consideration, and may output the tactile sense signals substantially at the same time to all the driven working electrodes.

In the examples illustrated in FIGS. 17 and 18A and 18B, accordingly, the tactile sense signals are applied to the respective driven working electrodes 1 such that the vibrations propagate through the regions A and B in mutually opposite directions at the identical speed v ($v_A = v_B$). Thus, the user can perceive such a tactile sense that an object is scaled up about a midpoint between the regions A and B, without moving his/her finger. Herein, the tactile sense signal in the region A has the waveform f, and the tactile sense signal in the region B has the waveform g. The waveform f and the waveform g may be identical with or different from each other.

Herein, a suitable value of the vibrational motion propagating speed v is the same as the value described in relation to the first embodiment. Moreover, a suitable distance of the electrode-to-electrode distance 1 is the same as the value described in relation to the first embodiment.

As described above, the tactile sense presentation device 100 is capable of presenting traveling wave-like tactile senses which travel in mutually opposite directions, to the plurality of tactile sense presentation target sites 5 even when the plurality of tactile sense presentation target sites 5 relatively remains stationary to the tactile sense presentation unit 10. Moreover, the tactile sense presentation device 100 is capable of presenting, to the user, such a tactile sense that an object is scaled down or scaled up.

The tactile sense presentation device 100 according to the third embodiment is also capable of presenting an explicit tactile sense to the user with a comparatively compact configuration and with reduced power consumption.

Also in the tactile sense presentation device 100 according to the third embodiment, an insulating film formed on the working electrode 1 protects the working electrode 1. Thus, the tactile sense presentation device 100 is improved in resistance to wear and damage.

Also in the tactile sense presentation device 100 according to the third embodiment, the transparent tactile sense presentation unit 10 is used for receiving information of a tactile sense corresponding to an image displayed on the display device, thereby changing characteristics of the tactile sense presented in each partial region on the tactile sense presentation unit 10, in accordance with the displayed image. For example, the tactile sense characteristics can be changed in accordance with the movement, scale-up, scale-down and the like of an image.

Also in the tactile sense presentation device 100 according to the third embodiment, the tactile sense presentation unit 10 may be laminated on the screen of the display device.

Also in the tactile sense presentation device 100 according to the third embodiment, when the display device is of an active matrix type, the tactile sense presentation unit 10 may be configured to be an active matrix type (see FIGS. 21 and 22), and signal generation portions (elements 2, 3, 7 and the like in FIG. 22) may be formed on a back plane of the display device.

4-3. Modification Examples

Also in the third embodiment, a modification example, in which a touch panel function is added to the tactile sense presentation unit 10, can be considered as in the first and second embodiments.

Hereinafter, description will be given of a tactile sense presentation device 100v with the touch panel function which is the modification example of the third embodiment. The tactile sense presentation device 100v detects partial regions, where tactile sense presentation target sites 5 such as user's fingers are on, on the tactile sense presentation unit 10 by means of the touch sensor function, prior to the presentation of tactile senses. Then, the tactile sense presentation device 100v decides the regions where the tactile sense presentation sites 5 are on, as a tactile sense presentation region, and presents the tactile senses to only the regions. Herein, there is no necessity to apply a tactile sense signal for presenting the tactile sense to a working electrode in a region, where the presence of the tactile sense presentation target site 5 is not detected, on the tactile sense presentation unit 10. Thus, it is possible to present a tactile sense with further enhanced energy efficiency, and to reduce electric power to be consumed by the tactile sense presentation device in order to present the tactile sense. Additionally, the tactile sense presentation device 100v is capable of presenting feedbacks based on tactile senses with respect to the multiple touches by the user, with good efficiency.

Also in this modification example, the touch panel function can be realized in such a manner that a different touch panel is superposed on the tactile sense presentation unit 10.

Moreover, the touch panel function can also be realized in such a manner that at least some of the working electrodes 1 of the tactile sense presentation unit 10 are used as a capacitive touch sensor. For example, the working electrode 1 for presenting a tactile sense may be temporarily used as an electrode for touch sensing. Moreover, some of the working electrodes 1 may be used for touch sensing only. Thus, it is possible to keep a short distance between the tactile sense presentation unit 10 and the tactile sense presentation target site, and to present an explicit tactile sense with good sensitivity and with low power consumption. Alternatively, it is possible to keep a short distance between the touch panel and the user's finger, and to detect a position of the finger with good accuracy.

The tactile sense presentation device 100v which is the modification example of the third embodiment is equal in configuration to the tactile sense presentation devices 100v which are the modification examples of the first and second embodiments; therefore, the description of the configuration will not be given here.

Figure 20:
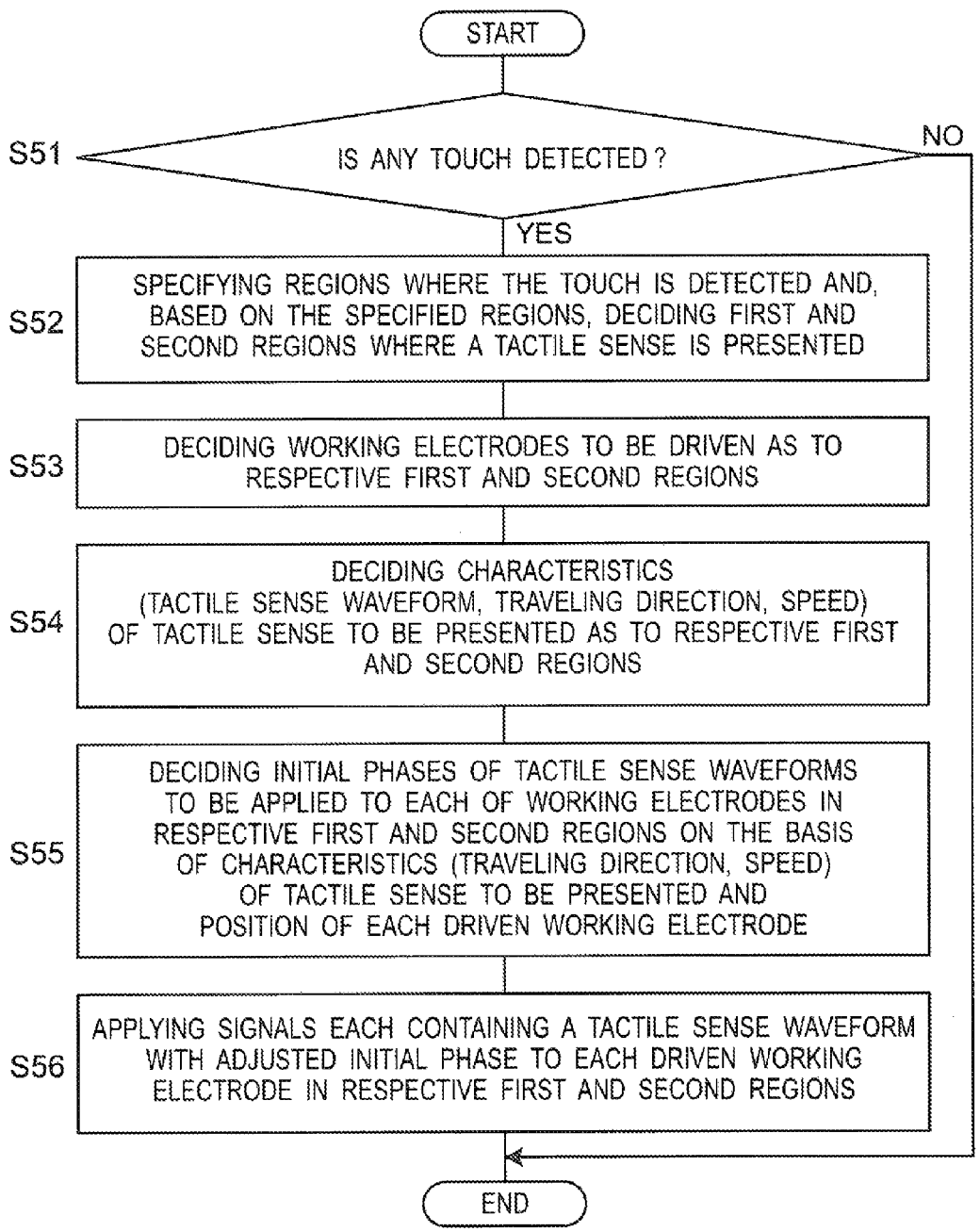
FIG. 20 is a flowchart of processing to be executed by a modification example of the tactile sense presentation device according to the third embodiment of the present invention (a tactile sense presentation device with a touch panel function).

FIG. 20 is a flowchart of processing to be executed by the tactile sense presentation device 100v in order to present tactile senses to the proximate regions to the touched positions, upon detection of the multiple touches.

In FIG. 20, steps S52 to S56 may be similar in details to steps S41 to S45 described with reference to FIG. 19, respectively. In FIG. 20, moreover, step S51 is similar in details to step S11 or S31 described with reference to FIG. 12 or 16. Therefore, the description of the respective steps will not be given here.

Also in the modification example of the third embodiment, as described above, the tactile sense presentation device 100v includes position identifying means for detecting the tactile sense presentation target site 5 which is in contact with or in proximity to the tactile sense presentation unit 10v, and identifying a position of the tactile sense presentation target site 5. Thus, the tactile sense presentation device 100v is capable of presenting a tactile sense to only the partial region covering the position of the tactile sense presentation target site 5. In other words, upon presentation of the tactile sense to the partial region covering the position of the tactile sense presentation target site 5, there is no necessity to apply a tactile sense signal for presenting the tactile sense to the working electrode in the region, where the presence of the tactile sense presentation target site 5 is not detected, on the tactile sense presentation unit 10. Thus, the tactile sense presentation device 100v allows reduction in power consumption upon presentation of a tactile sense.

5. Conclusions

In the foregoing description, the tactile sense signal waveform is a rectangular wave. In addition to the rectangular wave, the tactile sense signal waveform may be various waveforms such as a triangular wave, a step wave and a sinusoidal wave. Moreover, a low-frequency waveform may be modulated with a high-frequency waveform. For example, a rectangular wave may be modulated with a sinusoidal wave.

In the foregoing description, the tactile sense presentation unit 10 is of the passive matrix type. Alternatively, the tactile sense presentation unit 10 (and the tactile sense presentation unit 10v) may be an active matrix type tactile sense presentation unit 10ac illustrated in FIGS. 21 and 22.

Figure 21:
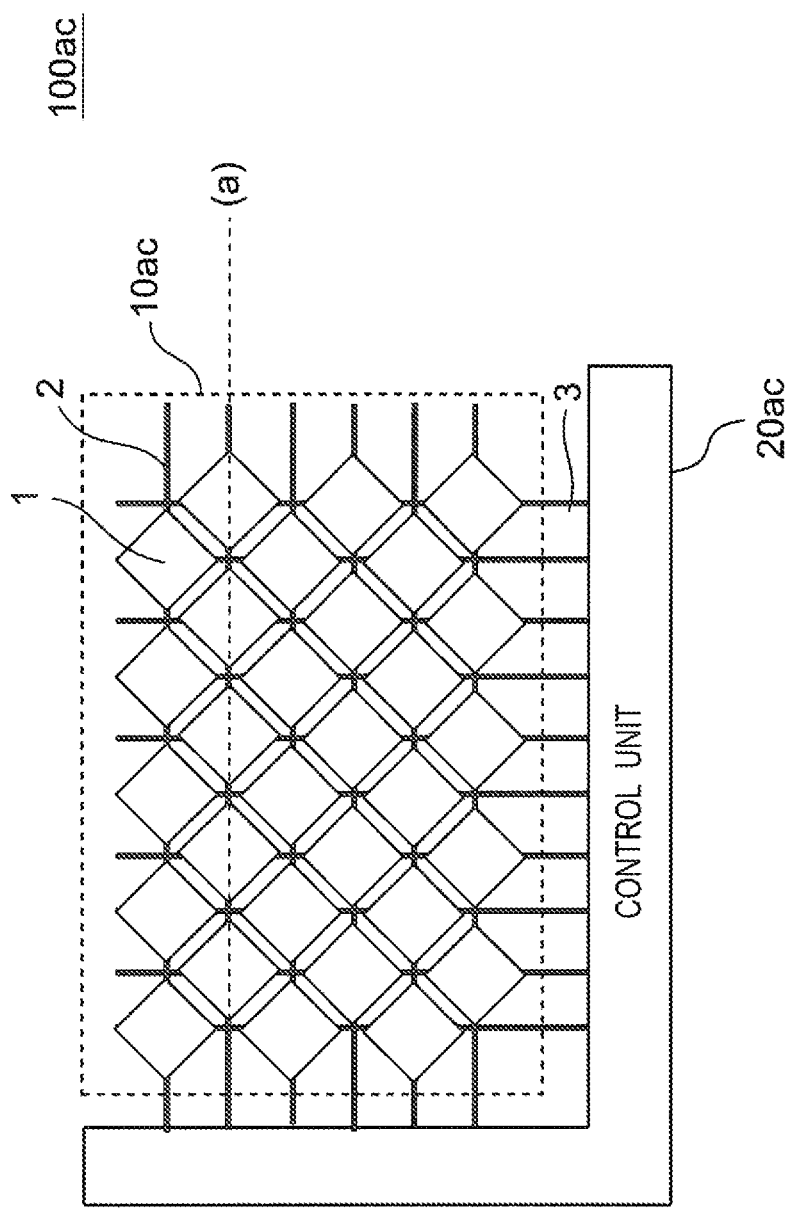
FIG. 21 is a diagram illustrating a structure of an (active matrix-type) tactile sense presentation unit according to one aspect of the present invention.
Figure 22:
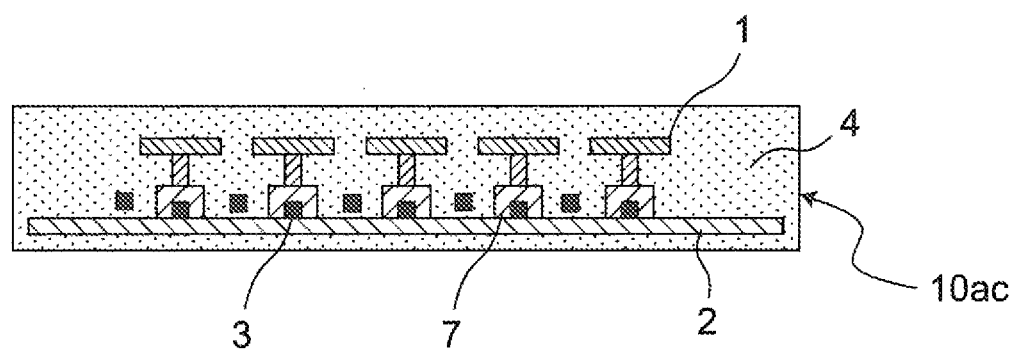
FIG. 22 is a sectional view of the (active matrix-type) tactile sense presentation unit, the sectional view being taken along a line (a) in FIG. 21.

FIG. 21 is a diagram illustrating a structure of the active matrix type tactile sense presentation unit 10ac. FIG. 22 is a sectional view of the tactile sense presentation unit 10ac, the sectional view being taken along a line (a) in FIG. 21.

In the tactile sense presentation unit 10ac, a first conductor 2 and a second conductor 3 are connected to working electrodes 1 through semiconductor circuits 7 (semiconductor switches), respectively. Moreover, a control unit 20ac is capable of selectively applying tactile sense signals to some of or all of the working electrodes 1 while controlling an open/close state of each semiconductor circuit 7. The tactile sense presentation unit 10ac can be used for the tactile sense presentation device 100 (or 100v) according to one aspect of the present invention.

Figure 23:
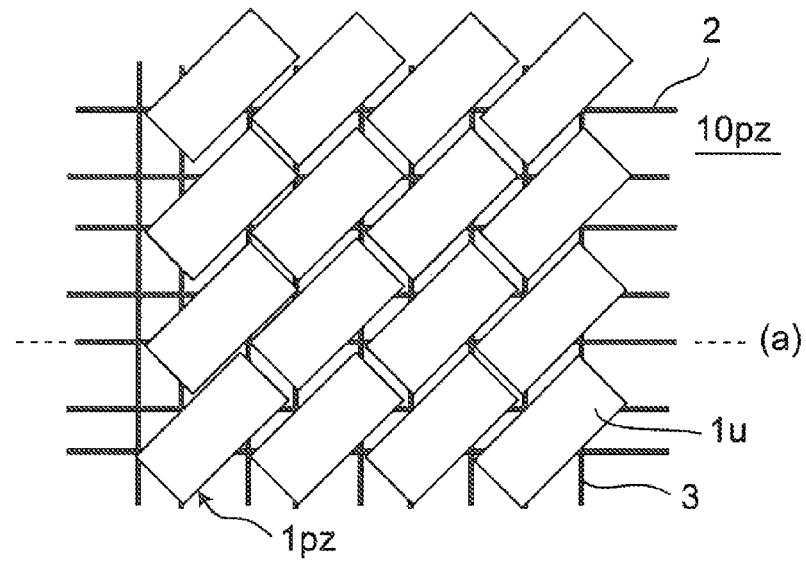
FIG. 23 is a diagram illustrating a structure of a (piezoelectric element-type) tactile sense presentation unit according to another aspect of the present invention.
Figure 24:
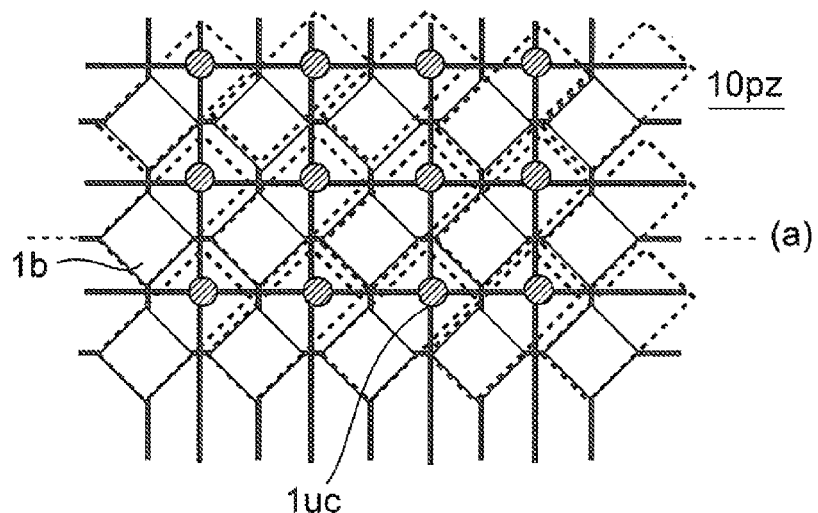
FIG. 24 is a diagram illustrating the structure of the (piezoelectric element-type) tactile sense presentation unit according to another aspect of the present invention (a diagram in a case where the upper electrodes in FIG. 23 are omitted).
Figure 25:
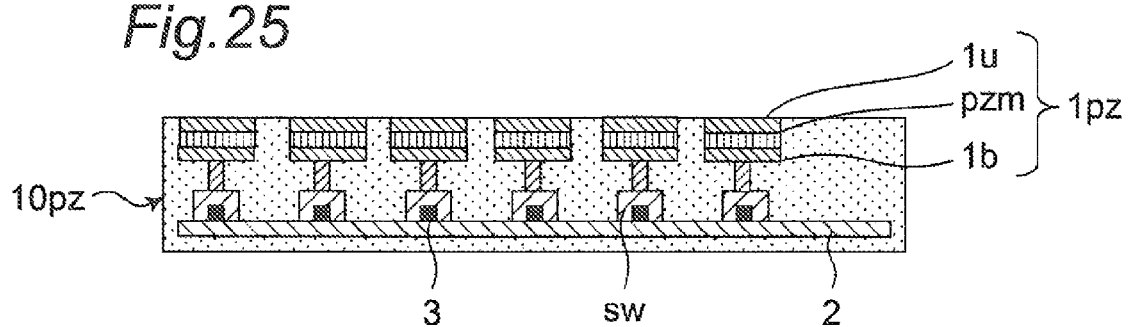
FIG. 25 is a sectional view of the (piezoelectric element-type) tactile sense presentation unit, the sectional view being taken along a line (a) in FIGS. 23 and 24.

Alternatively, the tactile sense presentation unit 10 may include a piezoelectric element rather than the working electrode 1. FIG. 23 is a plan view of a tactile sense presentation unit 10pz including piezoelectric elements 1pz. FIG. 24 is a plan view of the tactile sense presentation unit 10pz in a case where upper electrodes 1u of the piezoelectric elements 1pz are not illustrated. FIG. 24 illustrates lower electrodes 1b. A reference sign 1uc denotes a contact portion of the upper electrode 1u. FIG. 25 is a sectional view of the tactile sense presentation unit 10pz, the sectional view being taken along a line (a) in FIGS. 23 and 24.

The piezoelectric element 1pz may be an element having a three-layer structure that a ceramic piezoelectric material such as zirconium titanate or an organic piezoelectric material such as polyvinylidene fluoride (PVFD) is interposed between two electrodes. With regard to connections to lead-out electrodes, one of the two electrodes (the upper electrode 1u) of the piezoelectric element 1pz may be connected to the first lead-out electrode, and the other electrode (the lower electrode 1b) may be connected to the second lead-out electrode.

The tactile sense presentation unit 10 may include a laser element in place of or in addition to the working electrode 1, so that a laser beam rather than an electric signal may be emitted to a human body site (a tactile sense presentation target site 5) which is in proximity to the tactile sense presentation unit 10. The tactile sense presentation target site receives heat by the laser beam, so that the user can perceive a tactile sense (a heat sense).

The tactile sense presentation unit 10 may also include a magnetostrictor in place of or in addition to the working electrode 1, so that dynamic vibrational energy may be applied to the human body site (the tactile sense presentation target site 5) which is in proximity to the tactile sense presentation unit 10. Thus, the user can perceive a tactile sense based on dynamic vibrations, in place of or in addition to vibrations based on electrical stimulations.

The foregoing tactile sense presentation device according to one aspect of the present invention is not limited to the foregoing configurations, and may be modified in various forms.

The tactile sense presentation device according to one aspect of the present invention is applicable to, for example, mobile phones, smartphones, tablet terminals, information terminal displays, television sets, automobile console panels, home electric appliance console panels, guide boards for the visually impaired. All the application examples allow presentation of a variety of tactile sense information to a user through user's tactile sensibility.

According to a first aspect of the present invention, a tactile sense presentation device includes: a tactile sense presentation unit including a first working electrode group of a plurality of first working electrodes arranged along a first direction; and a control unit operable to apply a first tactile sense signal having a first waveform to each of the first working electrodes. Herein, the control unit applies the first tactile sense signal, in which a phase difference corresponding to a distance between adjacent first working electrodes is applied to the first waveform, to each of the plurality of first working electrodes so as to cause the first waveform to travel along the first direction at a predetermined speed.

According to this aspect, the first working electrode group constitutes a tactile sense presentation region on the tactile sense presentation unit. In the tactile sense presentation device, the working electrodes generate electrical vibrations based on electric signals which are identical in waveform with one another, at different timings (with a phase difference). Thus, the tactile sense presentation device presents vibrations which propagate on the tactile sense presentation unit along the predetermined first direction at the predetermined speed v, to a tactile sense presentation target site. Hence, the tactile sense presentation device is capable of presenting an explicit tactile sense to a user even when the tactile sense presentation target site relatively remains stationary to the tactile sense presentation unit (i.e., without a necessity for the user to move his/her finger). Accordingly, the tactile sense presentation device is capable of presenting an explicit tactile sense to the user with good sensitivity even when the tactile sense presentation unit has a comparatively limited area or even at an end or corner of the tactile sense presentation unit. Moreover, the tactile sense presentation device is capable of making the user to perceive the vibrational motion which travels along the predetermined first direction. Therefore, the tactile sense presentation device is capable of presenting to the user a tactile sense to be obtained when the user moves his/her finger along a specific direction.

According to a second aspect of the present invention, in the first aspect, the control unit may obtain the phase difference Δt between the adjacent first working electrodes on the basis of Δt=v/L, in which v represents the predetermined speed, and L represents the distance between the adjacent first working electrodes.

According to a third aspect of the present invention, in the first or second aspect, the tactile sense presentation unit may output the first tactile sense signal directly to a tactile sense presentation target site.

According to a fourth aspect of the present invention, in any one of the first to third aspects, the control unit may apply the first tactile sense signal to which the phase difference is applied, to each of the first working electrodes such that the first waveform travels back and forth along the first direction in a predetermined cycle.

According to this aspect, the tactile sense presentation device is capable of presenting an explicit tactile sense which travels back and forth, to a user (for example, over plural times) even when the tactile sense presentation target site relatively remains stationary to the tactile sense presentation unit (i.e., without a necessity for the user to move his/her finger). Accordingly, the tactile sense presentation device is capable of presenting an explicit tactile sense to the user with good sensitivity even when the tactile sense presentation unit has a comparatively limited area or even at an end or corner of the tactile sense presentation unit. Moreover, the tactile sense presentation device is capable of making the user to perceive vibrational motion which travels back and forth along the predetermined direction. Therefore, the tactile sense presentation device is capable of presenting to the user a tactile sense to be obtained when the user moves his/her finger back and forth along a specific direction.

According to a fifth aspect of the present invention, in the fourth aspect, the control unit may obtain the phase difference $\Delta t$ between the adjacent first working electrodes on the basis of $\Delta t = v/L$ (t: $0 \le t \le \theta$), in which $2\theta$ represents the predetermined cycle, v represents the predetermined speed, and L represents the distance between the adjacent first working electrodes.

According to a sixth aspect of the present invention, in any one of the first to fifth aspects, the tactile sense presentation unit may further include a second working electrode group of a plurality of second working electrodes arranged along a second direction. Moreover, the control unit may apply a second tactile sense signal having a second waveform, in which a phase difference corresponding to a distance between adjacent second working electrodes is applied to the second waveform, to each of the second working electrodes so as to cause the second waveform to travel along the second direction at a predetermined speed.

According to a seventh aspect of the present invention, in the sixth aspect, the control unit may obtain the phase difference $\Delta t1$ between the adjacent first working electrodes and the phase difference $\Delta t2$ between the adjacent second working electrodes on the basis of $\Delta t1 = v/L1$ and $\Delta t2 = v/L2$, in which v represents the predetermined speed, L1 represents the distance between the adjacent first working electrodes, and L2 represents the distance between the adjacent second working electrodes.

According to an eighth aspect of the present invention, in the sixth or seventh aspect, the tactile sense presentation unit may output the first tactile sense signal and the second tactile sense signal directly to the tactile sense presentation target site.

According to a ninth aspect of the present invention, in any one of the sixth to eighth aspects, the second direction may be parallel with the first direction.

According to a tenth aspect of the present invention, in the ninth aspect, the second direction may be opposite to the first direction.

According to this aspect, in the plurality of tactile sense presentation regions (the first and second working electrode groups), it is possible to present such a tactile sense that an object presenting the tactile sense is being scaled up or scaled down about a middle portion between the tactile sense presentation regions.

According to an eleventh aspect of the present invention, in the tenth aspect, the first direction may be a direction extending from the first working electrode group (the first tactile sense presentation region) toward the second working electrode group (the second tactile sense presentation region). Moreover, the second direction may be a direction extending from the second working electrode group (the second tactile sense presentation region) toward the first working electrode group (the first tactile sense presentation region).

According to this aspect, in the plurality of tactile sense presentation regions (the first and second working electrode groups), it is possible to present such a tactile sense that an object presenting the tactile sense is scaled down about the middle portion between the tactile sense presentation regions.

According to a twelfth aspect of the present invention, in the tenth aspect, the first direction may be a direction extending from the second working electrode group (the second tactile sense presentation region) toward the first working electrode group (the first tactile sense presentation region). Moreover, the second direction may be a direction extending from the first working electrode group (the first tactile sense presentation region) toward the second working electrode group (the second tactile sense presentation region).

According to this aspect, in the plurality of tactile sense presentation regions (the first and second working electrode groups), it is possible to present such a tactile sense that an object presenting the tactile sense is being scaled up about the middle portion between the tactile sense presentation regions.

According to a thirteenth aspect of the present invention, in any one of the first to twelfth aspects, the tactile sense presentation unit may apply an electrostatic force onto a tactile sense presentation target site which is in proximity thereto, to present the tactile sense to the tactile sense presentation target site.

According to a fourteenth aspect of the present invention, in any one of the first to thirteenth aspects, the control unit may detect a position of a tactile sense presentation target site which is in proximity to at least some of the first working electrodes, decide as a driven working electrode the first working electrodes in a predetermined region covering the detected position of the tactile sense presentation target site, on the basis of the detected position, and apply the first tactile sense signal to which the phase difference is applied, to each of the driven working electrodes among the plurality of first working electrodes. Thus, a touch panel function may be realized.

According to a fifteenth aspect of the present invention, in the fourteenth aspect, the control unit may apply the first tactile sense signal to which the phase difference is applied, to only the driven working electrode among the plurality of first working electrodes.

According to a sixteenth aspect of the present invention, in the fourteenth or fifteenth aspect, at least some of the first working electrodes may be used for detecting the position of the tactile sense presentation target site which is in proximity to at least some of the first working electrodes.

According to this aspect, it is possible to reduce electric power required for presentation of a tactile sense.

According to a seventeenth aspect of the present invention, in any one of the first to sixteenth aspects, the control unit may include an input unit receiving an external input, and decide at least one of the working electrode that the signal is to be applied, the shape of the first waveform, and the predetermined speed, on the basis of information received through the input unit.

According to this aspect, the tactile sense presentation device is capable of changing an electrode that presents a tactile sense, and a characteristic of the tactile sense to be presented, at any time on the basis of information received from the outside. Therefore, the tactile sense presentation device is capable of presenting a variety of tactile senses. In collaboration with an external device, moreover, the tactile sense presentation device is capable of presenting to a user a tactile sense in conjunction with information for stimulating a different sense (a visual sense, an auditory sense).

According to an eighteenth aspect of the present invention, in the seventeenth aspect, the input unit may receive information of a characteristic of a tactile sense corresponding to an image displayed on an external display device. Moreover, the control unit may decide at least one of the working electrodes that applies the signal, the shape of the first waveform, and the predetermined velocity, on the basis of the tactile sense characteristic information.

According to this aspect, it is possible to present a tactile sense corresponding to an image displayed on the external display device, in the working electrode corresponding to the image.

According to a nineteenth aspect of the present invention, in any one of the first to eighteenth aspects, the tactile sense presentation unit may further include a piezoelectric element group of a plurality of piezoelectric elements arranged along the first direction.

According to this aspect, the tactile sense presentation device is capable of applying mechanical vibrational stimulations to the tactile sense presentation target site.

According to a twentieth aspect of the present invention, in any one of the first to eighteenth aspects, the tactile sense presentation unit may include a piezoelectric element group of a plurality of piezoelectric elements arranged along the first direction, in place of the first working electrode group.

According to this aspect, the tactile sense presentation device is capable of applying mechanical vibrational stimulations to the tactile sense presentation target site.

According to a twenty-first aspect of the present invention, in any one of the first to fifth aspects, the tactile sense presentation unit may include a third working electrode in addition to the first working electrode group. Moreover, upon application of the first tactile sense signal to the first working electrode, the control unit may not apply the first tactile sense signal to the third working electrode.

According to a twenty-second aspect of the present invention, in any one of the sixth to twelfth aspects, the tactile sense presentation unit may include a third working electrode in addition to the first working electrode group and the second working electrode group. Moreover, upon application of the first tactile sense signal and the second tactile sense signal to the first working electrode and the second working electrode, respectively, the control unit may not apply the first tactile sense signal and the second tactile sense signal to the third working electrode.

According to a twenty-third aspect of the present invention, a tactile sense presentation method is a method for presenting a tactile sense with a tactile sense presentation device including a tactile sense presentation unit having a first working electrode group of a plurality of first working electrodes arranged along a first direction. The tactile sense presentation method includes: deciding a phase difference corresponding to a distance between the adjacent first working electrodes such that a first waveform travels along the first direction at a predetermined speed, by a control unit of the tactile sense presentation device; and applying the first tactile sense signal to which the phase difference is applied, to each of the first working electrodes, by the control unit.

According to this aspect, the first working electrode group forms a tactile sense presentation region on the tactile sense presentation unit. In the tactile sense presentation device, the working electrodes generate electrical vibrations based on electric signals which are identical in waveform with one another, at different timings (with a phase difference). Thus, the tactile sense presentation device presents, to a tactile sense presentation target site, vibrations which propagate on the tactile sense presentation unit along the predetermined first direction at the predetermined speed v. Hence, the tactile sense presentation device is capable of presenting an explicit tactile sense to a user even when the tactile sense presentation target site relatively remains stationary to the tactile sense presentation unit (i.e., without a necessity for the user to move his/her finger). Accordingly, the tactile sense presentation device is capable of presenting an explicit tactile sense to the user with good sensitivity even when the tactile sense presentation unit has a comparatively limited area or even at an end or corner of the tactile sense presentation unit. Moreover, the tactile sense presentation device is capable of making the user to perceive the vibrational motion which travels along the predetermined first direction. Therefore, the tactile sense presentation device is capable of presenting to the user a tactile sense to be obtained when the user moves his/her finger along a specific direction.

REFERENCE SIGNS LIST

1 Working electrode
2 First conductor
3 Second conductor
4 Insulator
5 Finger (tactile sense presentation target site)
10 Tactile sense presentation unit
10v Tactile sense presentation unit with touch panel function
20 Control unit
100 Tactile sense presentation device
100v Tactile sense presentation device with touch panel function
201 Tactile sense presentation region decision unit
202 Driven working electrode decision unit
203 Tactile sense characteristic decision unit
204 Drive signal output unit
205 Tactile sense characteristic information holding unit
206 Input unit
211 Touch sensor unit

The invention claimed is:

1. A tactile sense presentation device comprising:
a tactile sense presentation unit including a first working electrode group of a plurality of first working electrodes arranged along a first direction; and
a control unit operable to apply a first tactile sense signal having a first waveform to each of the first working electrodes,
wherein the control unit applies the first tactile sense signal, in which a phase difference corresponding to a distance between adjacent first working electrodes is applied to the first waveform, to each of the plurality of first working electrodes so as to cause the first waveform to travel along the first direction at a predetermined speed.

2. The tactile sense presentation device according to claim 1, wherein the control unit obtains the phase difference $\Delta t$ between the adjacent first working electrodes on the basis of $\Delta t = v/L$, the v representing the predetermined speed, and the L representing the distance between the adjacent first working electrodes.

3. The tactile sense presentation device according to claim 1, wherein the tactile sense presentation unit outputs the first tactile sense signal directly to a tactile sense presentation target site.

4. The tactile sense presentation device according to claim 1, wherein the control unit applies the first tactile sense signal to which the phase difference is applied, to each of the first working electrodes such that the first waveform travels back and forth along the first direction in a predetermined cycle.

5. The tactile sense presentation device according to claim 4, wherein the control unit obtains the phase difference $\Delta t$ between the adjacent first working electrodes on the basis of $\Delta t = v/L$ (t: $0 \le t \le \theta$), the $2\theta$ representing the predetermined cycle, the v representing the predetermined speed, and the L representing the distance between the adjacent first working electrodes.

6. The tactile sense presentation device according to claim 1, wherein:
the tactile sense presentation unit further includes a second working electrode group of a plurality of second working electrodes arranged along a second direction; and
the control unit applies a second tactile sense signal having a second waveform, in which a phase difference corresponding to a distance between adjacent second working electrodes is applied to the second waveform, to each of the second working electrodes so as to cause the second waveform to travel along the second direction at the predetermined speed.

7. The tactile sense presentation device according to claim 6, wherein the control unit obtains the phase difference $\Delta t1$ between the adjacent first working electrodes and the phase difference $\Delta t2$ between the adjacent second working electrodes on the basis of $\Delta t1 = v/L1$ and $\Delta t2 = v/L2$, the v representing the predetermined speed, the L1 representing the distance between the adjacent first working electrodes, and the L2 representing the distance between the adjacent second working electrodes.

8. The tactile sense presentation device according to claim 6, wherein the tactile sense presentation unit outputs the first tactile sense signal and the second tactile sense signal directly to the tactile sense presentation target site.

9. The tactile sense presentation device according to claim 6, wherein the second direction is parallel with the first direction.

10. The tactile sense presentation device according to claim 9, wherein the second direction is opposite to the first direction.

11. The tactile sense presentation device according to claim 10, wherein:
the first direction is a direction extending from the first working electrode group toward the second working electrode group; and
the second direction is a direction extending from the second working electrode group toward the first working electrode group.

12. The tactile sense presentation device according to claim 10, wherein:
the first direction is a direction extending from the second working electrode group toward the first working electrode group; and
the second direction is a direction extending from the first working electrode group toward the second working electrode group.

13. The tactile sense presentation device according to claim 1, wherein the tactile sense presentation unit applies an electrostatic force onto a tactile sense presentation target site which is in proximity thereto, to present the tactile sense to the tactile sense presentation target site.

14. The tactile sense presentation device according to claim 1, wherein the control unit detects a position of a tactile sense presentation target site which is in proximity to at least some of the first working electrodes, decides as a driven working electrode the first working electrodes in a predetermined region covering the detected position of the tactile sense presentation target site, on the basis of the detected position, and applies the first tactile sense signal to which the phase difference is applied, to each of the driven working electrodes among the plurality of first working electrodes.

15. The tactile sense presentation device according to claim 14, wherein the control unit applies the first tactile sense signal to which the phase difference is applied, to only the driven working electrode among the plurality of first working electrodes.

16. The tactile sense presentation device according to claim 14, wherein at least some of the first working electrodes are used for detecting the position of the tactile sense presentation target site which is in proximity to at least some of the first working electrodes.

17. The tactile sense presentation device according to claim 1, wherein the control unit includes an input unit receiving an external input, and decides at least one of the working electrode that the signal is to be applied, the shape of the first waveform, and the predetermined speed, on the basis of information received through the input unit.

18. The tactile sense presentation device according to claim 17, wherein:
the input unit receives information of a characteristic of a tactile sense corresponding to an image displayed on an external display device; and
the control unit decides at least one of the working electrode that the signal is to be applied, the shape of the first waveform, and the predetermined speed, on the basis of the tactile sense characteristic information.

19. The tactile sense presentation device according to claim 1, wherein the tactile sense presentation unit further includes a piezoelectric element group of a plurality of piezoelectric elements arranged along the first direction.

20. The tactile sense presentation device according to claim 1, wherein the tactile sense presentation unit includes a piezoelectric element group of a plurality of piezoelectric elements arranged along the first direction, in place of the first working electrode group.

21. The tactile sense presentation device according to claim 1, wherein:
the tactile sense presentation unit includes a third working electrode in addition to the first working electrode group; and
upon application of the first tactile sense signal to the first working electrode, the control unit does not apply the first tactile sense signal to the third working electrode.

22. The tactile sense presentation device according to claim 6, wherein:
the tactile sense presentation unit includes a third working electrode in addition to the first working electrode group and the second working electrode group; and
upon application of the first tactile sense signal and the second tactile sense signal to the first working electrode and the second working electrode, respectively, the control unit does not apply the first tactile sense signal and the second tactile sense signal to the third working electrode.

23. A tactile sense presentation method for presenting a tactile sense with a tactile sense presentation device including a tactile sense presentation unit having a first working electrode group of a plurality of first working electrodes arranged along a first direction, the tactile sense presentation method comprising:

deciding a phase difference corresponding to a distance between the adjacent first working electrodes such that a first waveform travels along the first direction at a predetermined speed, by a control unit of the tactile sense presentation device; and applying the first tactile sense signal to which the phase difference is applied, to each of the first working electrodes, by the control unit.

* * * * *